(12) United States Patent
Ho et al.

(10) Patent No.: US 6,418,176 B1
(45) Date of Patent: Jul. 9, 2002

(54) FORWARDED CLOCK RECOVERY WITH VARIABLE LATENCY

(75) Inventors: Steven Ho; Denis Foley, both of Middlesex, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/118,527

(22) Filed: Jul. 17, 1998

(51) Int. Cl.[7] .......................... H04L 7/00; H04L 25/00; H04L 25/40
(52) U.S. Cl. ...................................................... 375/372
(58) Field of Search ................................ 375/354, 355, 375/356, 360, 372, 377, 371; 370/503, 507, 517, 345, 350; 327/141, 153, 161

(56) References Cited

U.S. PATENT DOCUMENTS

| | | | |
|---|---|---|---|
| 4,811,364 A | 3/1989 | Sager et al. ................. 375/106 |
| 4,979,190 A | 12/1990 | Sager et al. ................. 375/106 |
| 5,003,537 A | 3/1991 | Sager ............................ 375/10 |
| 5,923,613 A | * 7/1999 | Tien et al. |

* cited by examiner

*Primary Examiner*—Jean Corrielus
(74) *Attorney, Agent, or Firm*—Hamilton Brook Smith & Reynolds, P.C.

(57) ABSTRACT

A technique provides data from an information signal. The technique involves receiving the information signal in the forwarded clock device synchronously with a forwarded clock signal. The technique further involves recovering data contained within the information signal synchronously with a recovery clock signal such that the data is recovered with (i) a particular cycle latency when the recovery clock signal has an optimal rate for the forwarded clock device, and (ii) a different cycle latency when the recovery clock signal has a sub-optimal rate. The particular cycle latency may include more cycles than the different cycle latency. As such, the time latency may be shorter when the recovery clock signal has the sub-optimal rate.

20 Claims, 16 Drawing Sheets

FORWARDED CLOCK RECOVERY WITH VARIABLE LATENCY

BACKGROUND OF THE INVENTION

Clock forwarding is a technique that allows circuits to transfer data at high speeds. Clock forwarding involves sending more than one bit of data through each conductor of a data path in a single cycle of a clock signal, and providing the clock signal through a separate conductor such that it accompanies the data. In contrast, synchronous point-to-point communication involves sending a single bit of data through each data path conductor in a single cycle of a clock signal. As a result, the bandwidth of forwarded clock circuits is typically higher than that of synchronous point-to-point circuits.

Clock forwarding is useful in situations where the number of data path conductors is limited. For example, the specifications for an integrated circuit (IC) chip set may limit the number of data path pins that are available on certain ICs. In such a situation, the IC designers may include forwarded clock circuitry within particular ICs to allow those ICs to transfer multiple bits through each of their data path pins during a single clock cycle. Such an arrangement may reduce the effect of, or even eliminate, any data transfer bottleneck caused by the limited availability of data path pins.

In an IC that transmits data using clock forwarding (i.e., a transmit IC), multiple forwarded clock transmit circuits provide information signals through respective data path pins, and forwarded clock signals through respective forwarded clock pins. The information signals contain data synchronously with edges of the forwarded clock signals.

In an IC that receives data using clock forwarding (i.e., a receive IC), multiple forwarded clock receive circuits receive information signals through respective data path pins, and forwarded clock signals through respective forwarded clock pins. A typical forwarded clock receive circuit includes a receive stage that receives an information signal synchronously with a forwarded clock signal, and a recovery stage that recovers data contained within the information signal synchronously with a recovery clock signal (e.g., an internal clock signal of the receive IC). The receive stage is generally driven by the forwarded clock signal, and thus operates in a forwarded clock domain. In contrast, the recovery stage is generally driven by the recovery clock signal, and thus operates in a recovery clock domain. The recovery clock signal and the forwarded clock signal are independent of each other, but typically have the same frequency and edges that closely coincide.

It is common for IC designers to design forwarded clock ICs such that they operate properly at a number of different clock speeds (rates or frequencies). IC designers often know ahead of time the maximum clock speeds of the recovery clock signal that is to drive the recovery stages of the multiple forwarded clock receive circuits, and thus make design decisions with this maximum clock speed in mind. In particular, IC designers typically consider the maximum clock speed of the recovery clock signal to be the optimal clock rate for their designs, and optimize their designs (e.g., select critical tolerances and features of the IC) such that data is recovered with minimal time latency when the recovery clock signal is at the optimal rate.

SUMMARY OF THE INVENTION

A conventional forwarded clock receive circuit, which is optimized to recover data with minimal latency when the recovery clock signal has an optimal rate, typically operates properly when the recovery clock signal has a sub-optimal rate. In particular, when the recovery clock signal is at the sub-optimal rate, the recovery stage may perform identical operations in the same number of cycles such that the cycle latency remains the same. However, since the cycle length of the recovery clock signal is longer at the sub-optimal rate, the time latency for recovering the data is longer.

In contrast, an embodiment of the present invention enables data to be recovered with different cycle latencies when the recovery clock signal has different rates. The embodiment is directed to a technique for providing data from an information signal. The technique involves receiving the information signal in the forwarded clock device synchronously with a forwarded clock signal. The technique further involves recovering data contained within the information signal synchronously with a recovery clock signal such that the data is recovered with (I) a particular cycle latency when the recovery clock signal has an optimal rate for the forwarded clock device, and (ii) a different cycle latency when the recovery clock signal has a sub-optimal rate.

Preferably, the particular cycle latency includes more cycles than the different cycle latency. As such, the time latency may be shorter when the recovery clock signal has the sub-optimal rate. The shorter latency results in quicker response time by circuits that further process the recovered data. In one embodiment, the particular cycle latency is one cycle longer than the different cycle latency.

The forwarded clock device may include a receive buffer that receives the information signal synchronously with the forwarded clock signal, and a delay buffer. In this situation, recovering the data preferably involves transferring contents of the receive buffer to the delay buffer synchronously with the recovery clock signal. Furthermore, recovering the data preferably involves reading exclusively from the delay buffer to capture the data contained within the information signal when the recovery clock signal has the optimal rate, and selectively reading from the delay buffer and the receive buffer to capture the data contained within the information signal when the recovery clock signal has the sub-optimal rate.

Another embodiment of the invention is directed to a technique for providing data from an information signal involving buffers. In particular, the technique involves receiving the information signal in a receive buffer synchronously with a forwarded clock signal, and transferring contents of the receive buffer to a delay buffer synchronously with a recovery clock signal. The technique further involves selectively reading from the receive buffer and the delay buffer to form a recovered signal that is synchronous with the recovery clock signal, the recovered signal having the data contained within the information signal.

Preferably, the receive buffer includes multiple storage elements such that selectively reading from the receive buffer involves selecting and reading from an element of the receive buffer to recover the data with minimal latency. A multiplexer may be interconnected between an output of the receive buffer and an input of the delay buffer. In this situation, selecting and reading from the element may involve sampling at the output of the receive buffer to circumvent the multiplexer. Alternatively, selecting and reading may involve sampling at the input of the delay buffer to include a signal delay caused by the multiplexer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A is a block diagram of data and error correction codes suitable for transfer by forwarded clock circuits.

FIG. 1B is a block diagram of the data and error correction codes of FIG. 1A recovered and arranged by a forwarded clock circuit for further processing.

DETAILED DESCRIPTION OF PREFERRED EMBODIMENTS

Figure 2:
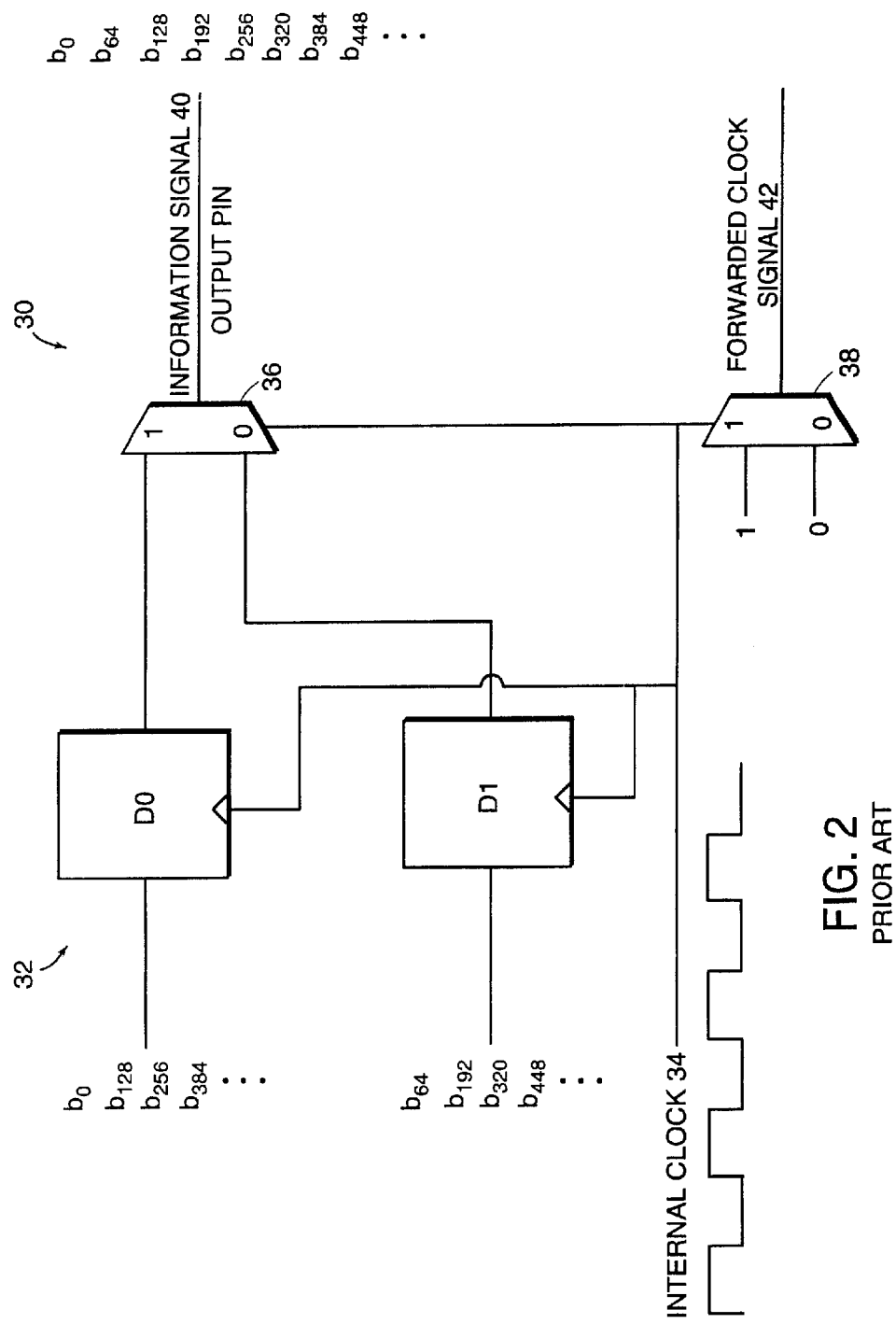
FIG. 2 is a circuit diagram of a forwarded clock transmit circuit.

An embodiment of the invention is directed to a technique for providing data from an information signal with variable latencies. In particular, a forwarded clock receive circuit (hereinafter receiver) receives the information signal synchronously with a forwarded clock signal, and recovers data contained within the information signal synchronously with a recovery clock signal. The receiver recovers the data with a particular cycle latency when the recovery clock signal has an optimal clock rate for the receiver, and a different cycle latency when the recovery clock signal has a sub-optimal clock rate.

The receiver is preferably disposed with other receivers in an integrated circuit (IC) called a receive IC. The receive IC is capable of receiving multiple information signals simultaneously, and recovering data from the multiple information signals for further processing. Further details of the receive IC and the receiver will be provided after the following description of the information signals and how they are generated.

A forwarded clock transmit circuit (hereinafter transmitter) is designed to provide an information signal containing data synchronously with a forwarded clock signal. The transmitter is preferably disposed with other transmitters in another type of IC called a transmit IC. The transmit IC provides multiple information signals and one or more forwarded clock signals to the receive IC simultaneously.

Figures 1A, 1B:
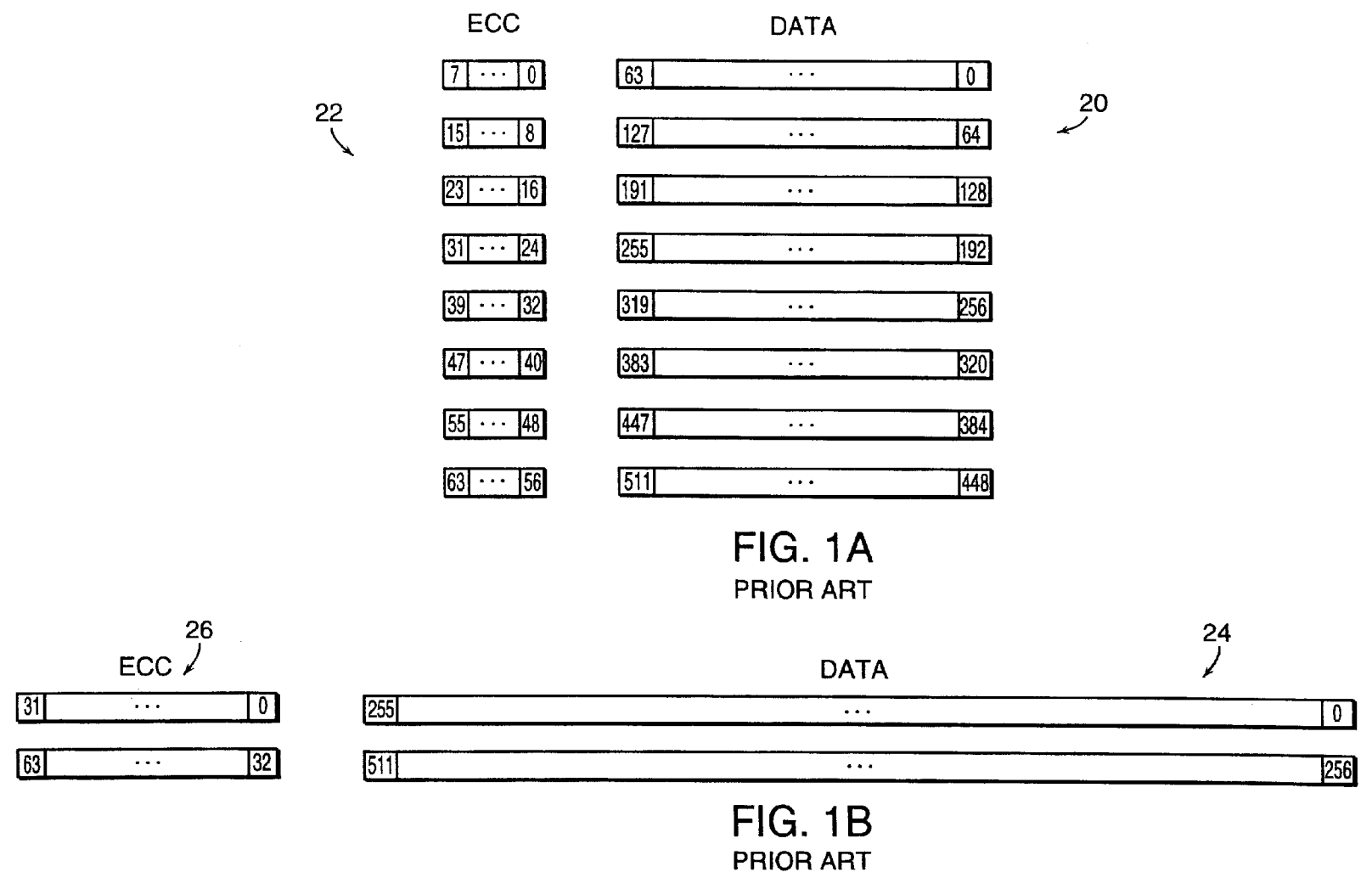

Reference is now made to the drawings wherein the same reference numbers are used throughout multiple figures to designate the same or similar components. FIG. 1A shows, by way of example, data contained within information signals that may be outputted by a transmit IC having 64 data pins and 8 error correction code (ECC) pins. The data includes 512 data bits that are arranged in 8 data bit groups 20, and 64 ECC bits that are arranged in 8 ECC bit groups 22. Each data pin and ECC pin of the transmit IC outputs an information signal containing a column of the data shown in FIG. 1A. That is, one data pin outputs an information signal having data bits $b_0$, $b_{64}$, $b_{128}$, $b_{192}$, $b_{256}$, $b_{320}$, $b_{384}$ and $b_{448}$. Another data pin outputs an information signal having data bits $b_1$, $b_{65}$, $b_{129}$, $b_{193}$, $b_{257}$, $b_{321}$, $b_{385}$ and $b_{449}$, and so on. Similarly, each ECC pin outputs an information signal containing a column of the ECC bits. The transmit IC further outputs one or more forwarded clock signals on one or more respective forwarded clock signal pins. Preferably, the transmit IC outputs one forwarded clock signal for every 9 information signals (for every 8 data pins and 1 ECC pin).

It should be understood that the data is arranged as shown in FIG. 1A to illustrate how the data is preferably provided by the transmit IC to the receive IC. There may be other arrangements of the data that are more suitable for further processing after the data is received and recovered by the receive IC. For example, the data of FIG. 1A may be rearranged as shown in FIG. 1B for further processing. In FIG. 1B, the data is arranged as two data bit groups 24 and two ECC bit groups 26. Each data bit group 24 has 256 data bits, and each ECC bit group 26 has 32 ECC bits.

FIG. 2 shows a transmitter 30 that provides an information signal containing data bits $b_0$, $b_{64}$, $b_{128}$, $b_{192}$, $b_{256}$, $b_{320}$, $b_{384}$ and $b_{448}$. The transmitter 30 includes two flip-flops D0 and D1, and two multiplexers 36 and 38. The multiplexer 36 includes a first input that is connected to the output of flip-flop D0, and a second input that is connected to the output of flip-flop D1. The multiplexer 38 includes a first input that receives an asserted signal (e.g., the value "1"), and a second input that receives a de-asserted signal (e.g., the value "0"). An internal clock signal 34 drives the two flip-flops D0 and D1, and controls selection of the inputs of the multiplexers 36 and 38.

During operation, the flip-flop Do reads, in order, bits $b_0$, $b_{128}$, $b_{256}$ and $b_{384}$ on rising edges of the internal clock signal 34. Simultaneously, flip-flop D1 reads, in order, bits $b_{64}$, $b_{192}$, $b_{320}$ and $b_{448}$ on the same rising edges. Accordingly, after the rising edge of a first clock cycle, flip-flops D0 and D1 respectively contain bits $b_0$ and $b_{64}$. Similarly, after the rising edge of a second clock cycle, flip-flops D0 and D1 respectively contain bits $b_{128}$ and $b_{192}$, and so on.

The multiplexer 36 reads the contents of one of the flip-flops D0 and D1 in each half of a clock cycle (or phase), and provides the read contents to an IC pin (e.g., a data pin). In particular, the multiplexer 36 outputs an information signal 40 that includes bit $b_0$ during an asserted half of the first clock cycle, and bit $b_{64}$ during a de-asserted half of the first clock cycle. The multiplexer 36 then outputs bit $b_{128}$ during the asserted half of the second clock cycle, and bit $b_{192}$ during the de-asserted half of the second clock cycle, and so on. While the multiplexer 36 outputs the information signal 40, the multiplexer 38 synchronously outputs a forwarded clock signal 42 resembling the internal clock signal 34. Use of the multiplexer 38 is preferred over simply outputting the internal clock signal 34 because the output characteristics of the multiplexer 38 more closely match the output characteristics of the output of the multiplexer 36.

It should be understood that the transmitter 30 requires 8 phases (i.e., 4 clock cycles) to output bits $b_0$, $b_{64}$, $b_{128}$, $b_{192}$, $b_{256}$, $b_{320}$, $b_{384}$ and $b_{448}$ within the information signal 40. Since the multiplexers 36, 38 are controlled by the same internal clock signal 34, each bit of the information signal 40 is synchronous with one of the 8 phases of the forwarded clock signal 42.

It should be further understood that the transmit IC includes multiple transmitters 30 that output the 512 data bits and 64 ECC bits during the 8 phases of the forwarded clock signal 42. In particular, the transmit IC outputs one of the data bit groups 20 through 64 transmitters 30 and corresponding pins, and one of the ECC bit groups 22 through 8 transmitters 30 and corresponding pins during each phase (see FIG. 1A). Since the transmit IC provides one forwarded clock signal for every 9 information signals, only one of every 9 transmitters 30 includes a multiplexer 38 for generating a forwarded clock signal.

Further details of the receive IC and its multiple receivers will now be provided. The receive IC preferably includes 64 data pins for receiving the information signals containing data bits, and 8 ECC pins for receiving the ECC bits of FIG. 1A. Additionally, the receive IC includes one or more forwarded clock pins that respectively receive one or more forwarded clock signals. After the receive IC receives the information signals, the receive IC recovers the data contained within the information signals and provides the data to other circuits for further processing. Preferably, the receive IC rearranges the data as the two data bit groups 24 and the two ECC bit groups 26 for further processing, as shown in FIG. 1B.

An embodiment of the invention is directed to a technique for providing data from an information signal, with the data being recovered with variable latencies depending on a rate of the recovery clock signal used when recovering the data. Before a description of this technique is provided, a description will be provided of a standard receiver that provides the same cycle latency regardless of the rate of the recovery clock signal.

Standard Receiver

Figure 3:
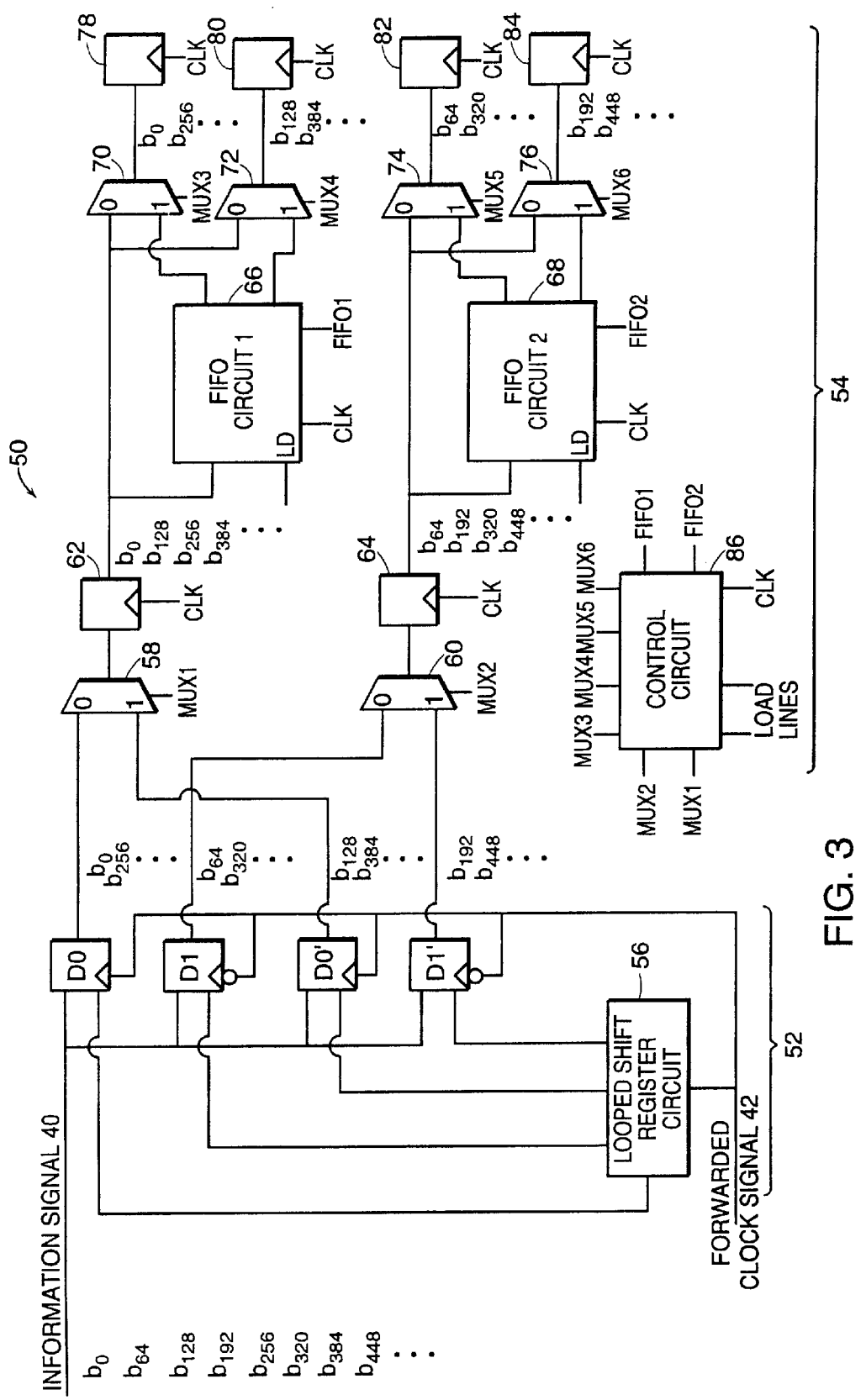
FIG. 3 is a circuit diagram of a forwarded clock receive circuit.

FIG. 3 shows a standard receiver 50 that recovers data with the same cycle latency regardless of the rate of the recovery clock signal. A receive IC may include multiple standard receivers 50 for simultaneously recovering data from multiple information signals. The standard receiver 50 includes a receive stage 52, and a recovery stage 54. The receive stage 52 includes four receive flip-flops D0, D1, D0' and D1', and a looped shift register circuit 56. The recovery stage 54 includes recovery multiplexers 58,60, recovery flip-flops 62,64, first-in-first-out (FIFO) circuits 66,68, output multiplexers 70,72,74,76, output flip-flops 78,80,82,84, and a control circuit 86.

The receive stage 52 receives an information signal and a forwarded clock signal such as those shown in FIG. 3. The forwarded clock signal drives the looped shift register circuit 56 and the four receive flip-flops D0, D1, D0' and D1' such that the receive stage 52 operates in the forwarded clock domain. Flip-flops D0 and D0' latch in the information signal on rising clock edges, and flip-flops D1 and D1' latch in the information signal on falling clock edges. The looped shift register circuit 56 selects enable inputs of the receive flip-flops D0, D1, D0' and D1' such that the flip-flops receive data contained within the information signal synchronously with edges (phases) of the forwarded clock signal. In particular, the flip-flops D0, D1, D0' and D1' operate one at a time to latch in a bit of the information signal during each phase of the forwarded clock signal.

For the information signal 40 including bits $b_0$, $b_{64}$, $b_{128}$, $b_{192}$, $b_{256}$, $b_{320}$, $b_{384}$ and $b_{448}$, the flip-flop D0 latches in bit $b_0$ on a rising edge (during a first phase) of a first cycle of the forwarded clock signal. Then, flip-flop D1 latches in bit $b_{64}$ on a falling edge (during a second phase) of the first cycle, and so on. Accordingly, the receive flip-flops D0, D1, D0' and D1' operate as a receive buffer that receives and temporarily stores the bits of the information signal.

It may be possible to receive the data bits using only two receive flip-flops (e.g., D0 and D1) if the physical devices that implement the transmit and receive logic are tight in tolerance (i.e., if the manufactured parts have little or no variation in timing for each data bit in the path and for each part). In such a situation, flip-flops D0' and D1' and multiplexers 58,60 would be unnecessary. The receive stage 52 preferably uses four flip-flops (D0, D1, D0' and D1') because the two additional flip-flops (D0' and D1') provide an increase of one full cycle of settling time allowance.

A recovery clock signal CLK (e.g., an internal clock signal of the receive IC) drives the recovery stage 54 such that the recovery stage 54 operates in the recovery clock domain. The recovery stage 54 recovers data contained within the information signal from the forwarded clock domain of the receive stage 52. In particular, the control circuit 86, which receives commands through command lines, operates the recovery multiplexers 58,60 such that they select and sample the outputs of the receive flip-flops D0, D1, D0' and D1' and allow the recovery flip-flops 62,64 to latch in the contents of the receive flip-flops D0, D1, D0' and D1'. After the bits of data are recovered from the receive stage 52, they are temporarily stored in the FIFO circuits 66,68. The control circuit 86 operates the output multiplexers 70,72,74,76 such that the data is read from the FIFO circuit 66,68, and provided to the output flip-flops 78,80, 82,84 in two consecutive cycles of the recovery clock signal. When each standard receiver 50 of a receive IC operates simultaneously, the data of FIG. 1A is provided in the arrangement shown in FIG. 1B.

Figure 4:
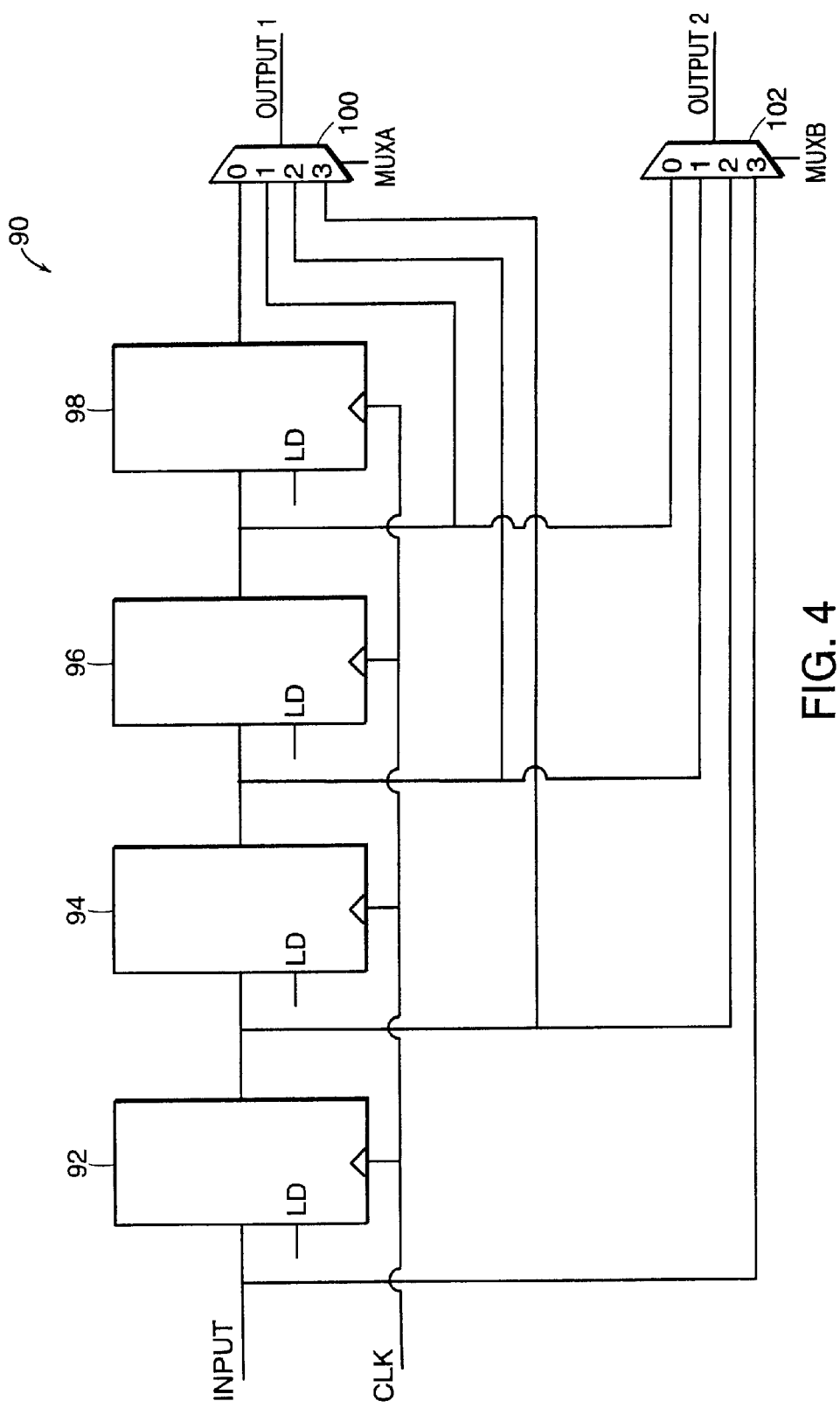
FIG. 4 is a circuit diagram of a delay buffer circuit.
Figure 5:
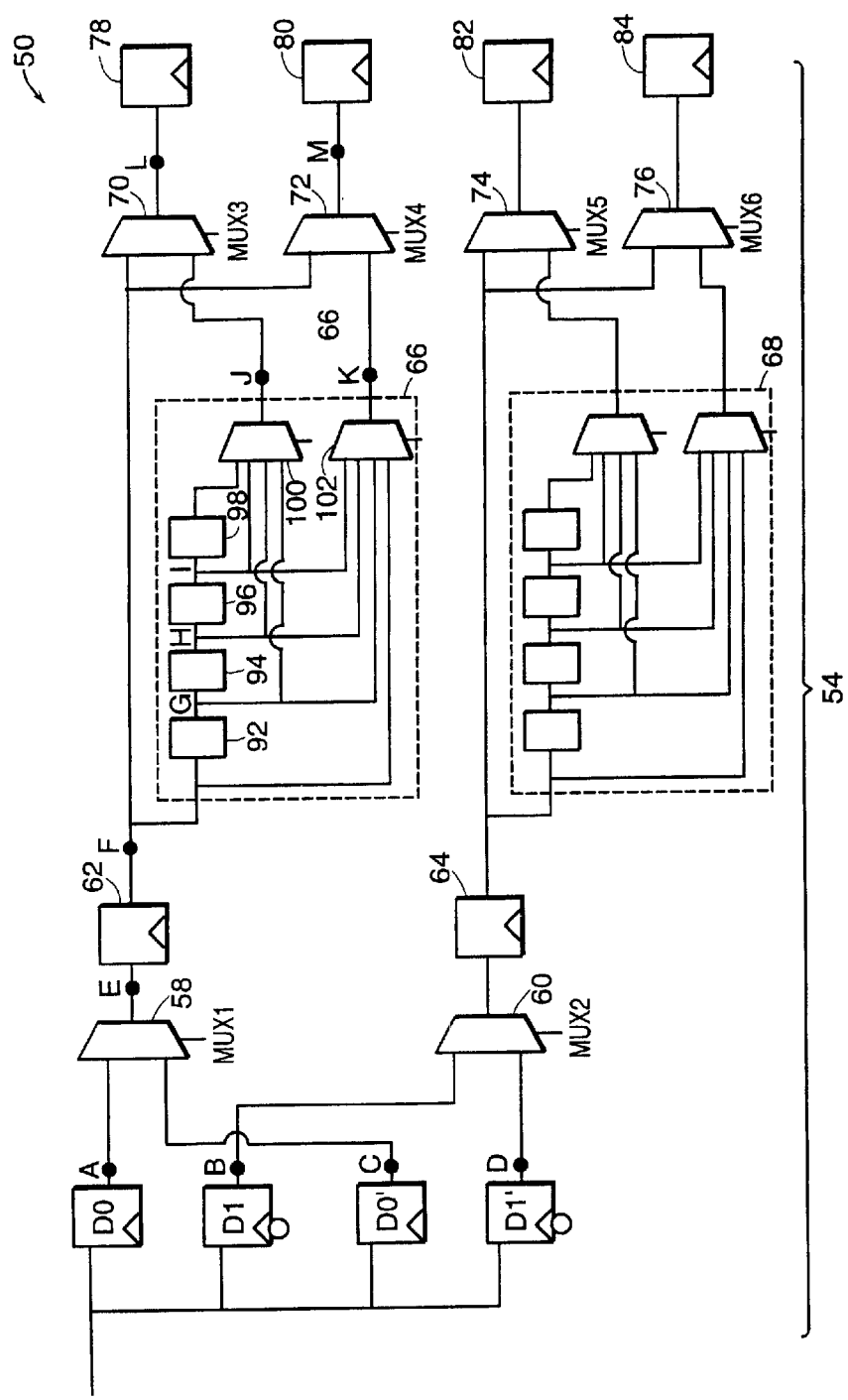
FIG. 5 is a circuit diagram of the forwarded clock receive circuit of FIG. 3 including the delay buffer circuit of FIG. 4.

It should be understood that the FIFO circuits 66,68 of the standard receivers 50 operate as buffers to temporarily store the bits recovered from the receive stages 52 long enough to allow the multiplexers 70,72,74,76 to read the bits from the FIFO circuits 66,68 and to provide them in the FIG. 1B arrangement. FIG. 4 is a circuit diagram of a delay buffer 90 that is suitable for each of the FIFO circuits 66,68. The delay buffer 90 includes flip-flops 92,94,96,98, and multiplexers 100,102. The flip-flops 92,94,96,98 are series connected in a cascading manner and are driven by the recovery clock signal CLK. The control circuit 86 of the recovery stage 54 provides load signals to the flip-flops 92,94,96,98, and provides selection signals to the multiplexers 100,102 to delay and select particular flip-flop outputs such that the recovered bits reach the output multiplexers 70,72,74,76 in correct order. FIG. 5 shows the standard receiver 50 of FIG. 3, with a delay buffer 90 in place of each FIFO circuit 66,68. Certain components such as the looped shift register 56 and the control circuit 86 are omitted from FIG. 5 to simplify the figure.

The operation of the standard receiver 50 will now be described with reference to FIGS. 5–8. FIG. 5 is labeled at certain points. In particular, the outputs of the receive flip-flops D0, D1, D0' and D1' are labeled A, B, C and D, respectively. Additionally, the output of the recovery multiplexer 58 is labeled E, and the output of the recovery flip-flop 62 is labeled F. Furthermore, the outputs of the FIFO flip-flops 92, 94 and 96 are labeled G, H and I, respectively. Also, the outputs of the FIFO multiplexers 100 and 102 are labeled J and K, respectively. Finally, the outputs of the multiplexers 70 and 72 are labeled L and M, respectively.

Figure 6:
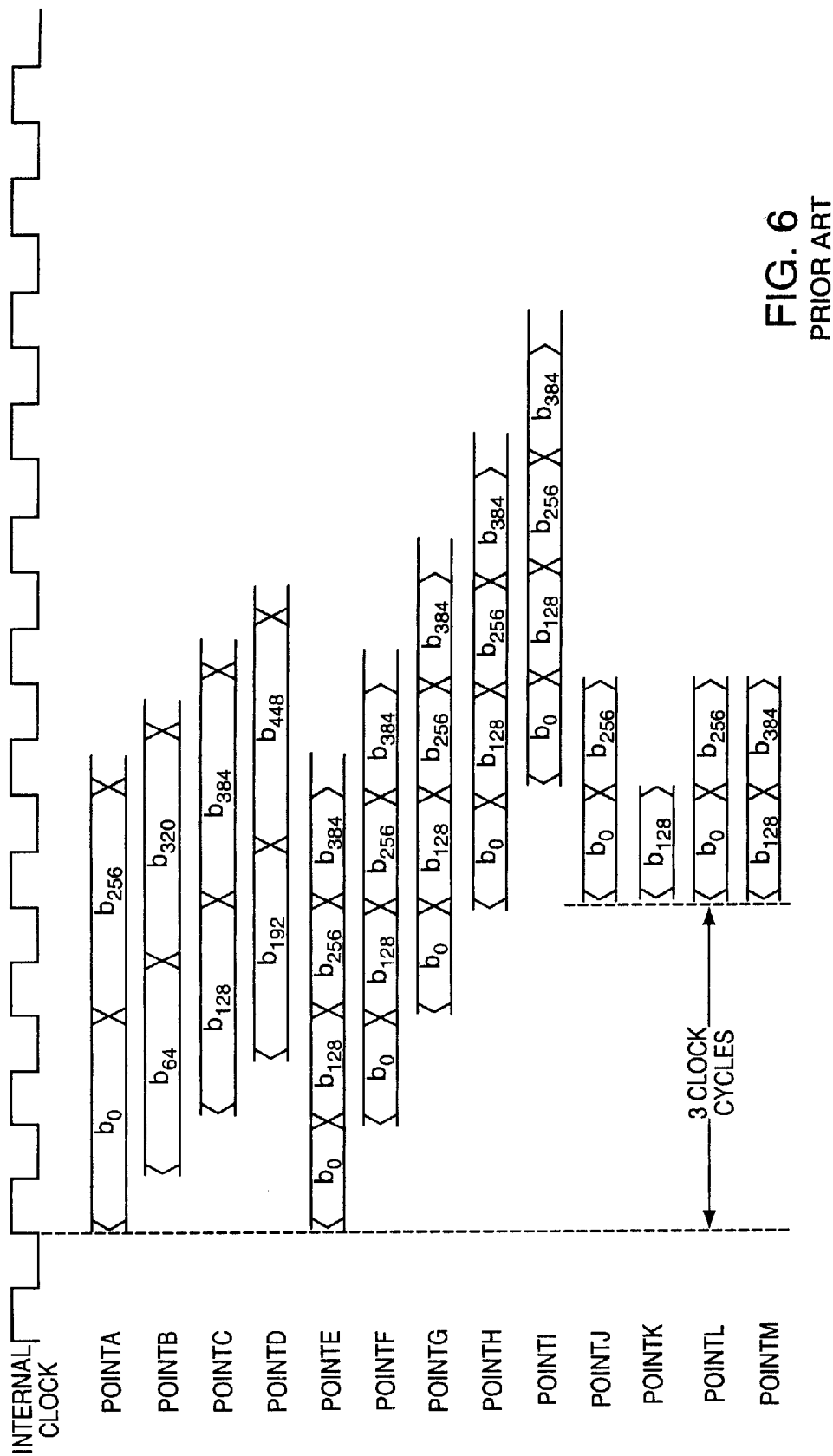
FIG. 6 is a timing diagram of signals at particular points within the forwarded clock receive circuit of FIG. 5.

FIG. 6 is a timing diagram showing signals at the various labeled points at different times relative to the recovery clock signal that drives the recovery stage 54 of the standard receiver 50. Although the forwarded clock signal is not shown in FIG. 6, the forwarded clock signal has the same frequency as the recovery clock signal, and the edges of the signals closely coincide.

For the information signal 40 of FIG. 3, the standard receiver 50 receives bits $b_0$, $b_{64}$, $b_{128}$, $b_{192}$, $b_{256}$, $b_{320}$, $b_{384}$ and $b_{448}$ synchronously with the forwarded clock signal. In particular, the rising edge of a first cycle of the forwarded clock signal causes the flip-flop D0 to latch in bit $b_0$ (see Point A in FIG. 6). On the rising edge of a first clock cycle of the recovery clock signal, the recovery multiplexer 58 selects and samples the output of the flip-flop D0 to channel its contents (bit $b_0$) to the recovery flip-flop 62. Additionally, the rising edge of the first clock cycle of the recovery clock signal causes the recovery flip-flop 62 to latch in bit $b_0$ from the output of the multiplexer 58 (see Point E in FIG. 6), and to store bit $b_0$ for a full clock cycle (i.e., until the next rising edge of the recovery clock signal).

Similarly, the falling edge of the first cycle of the forwarded clock signal causes the flip-flop D1 to latch in bit $b_{64}$ (see Point B in FIG. 6). On the rising edge of a second clock cycle of the recovery clock signal, the multiplexer 60 selects and samples the output of the flip-flop D1 and channels its contents to the recovery flip-flop 64. Additionally, the rising edge of the second clock cycle of the recovery clock signal causes the recovery flip-flop 64 to latch in bit $b_{64}$ from the output of the multiplexer 60, and the recovery flip-flop 64 stores bit $b_{64}$ for a complete clock cycle.

During operation, the recovery flip-flop 62 outputs a bit stream $b_0$, $b_{128}$, $b_{256}$ and $b_{384}$ (Point F), and the recovery flip-flop 64 similarly outputs a bit stream $b_{64}$, $b_{192}$, $b_{320}$ and $b_{448}$. The bit stream $b_0$, $b_{128}$, $b_{256}$ and $b_{384}$ propagates through the FIFO circuit 66 on successive clock cycles (Points G, H and I), and similarly the bit stream $b_{64}$, $b_{192}$, $b_{320}$ and $b_{448}$ propagates through the FIFO circuit 68. The control circuit 86 controls the propagation of the bits through the FIFO circuits 66,68 using load and multiplexer signals.

The FIFO multiplexers 100,102 and the output multiplexers 70,72,74,76 select particular circuit locations to read from in order to capture the bits in proper order for further processing. When the standard receiver 50 operates with other similar receivers in a receiver IC, each standard receiver 50 preferably provides the recovered bits in two consecutive recovery clock cycles with minimal time latency such that the receiver IC outputs data in the arrangement shown in FIG. 1B.

Figure 7:
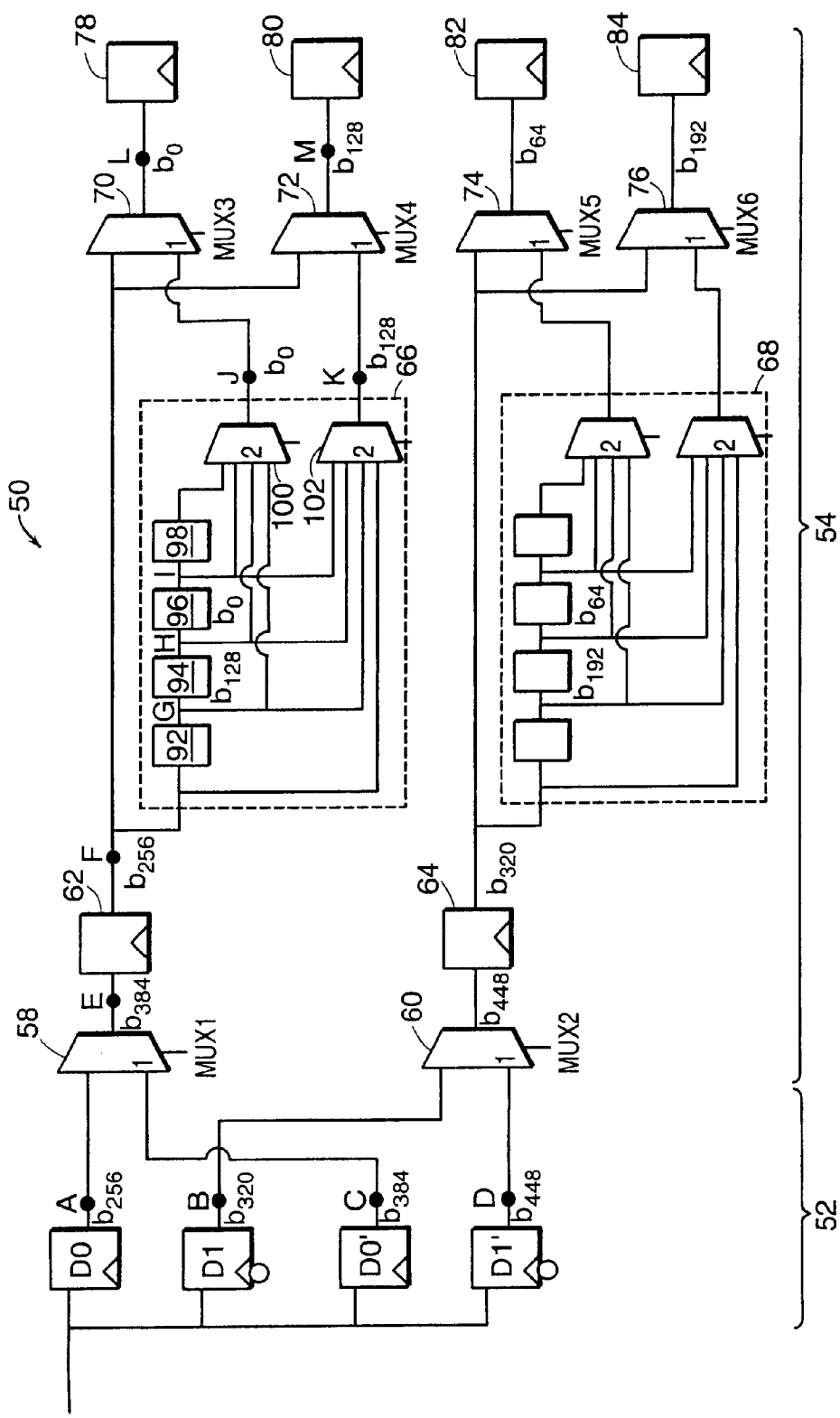
FIG. 7 is a circuit diagram of the forwarded clock receive circuit of FIG. 5 with the signals of FIG. 6 at the particular points during a particular clock cycle.
Figure 8:
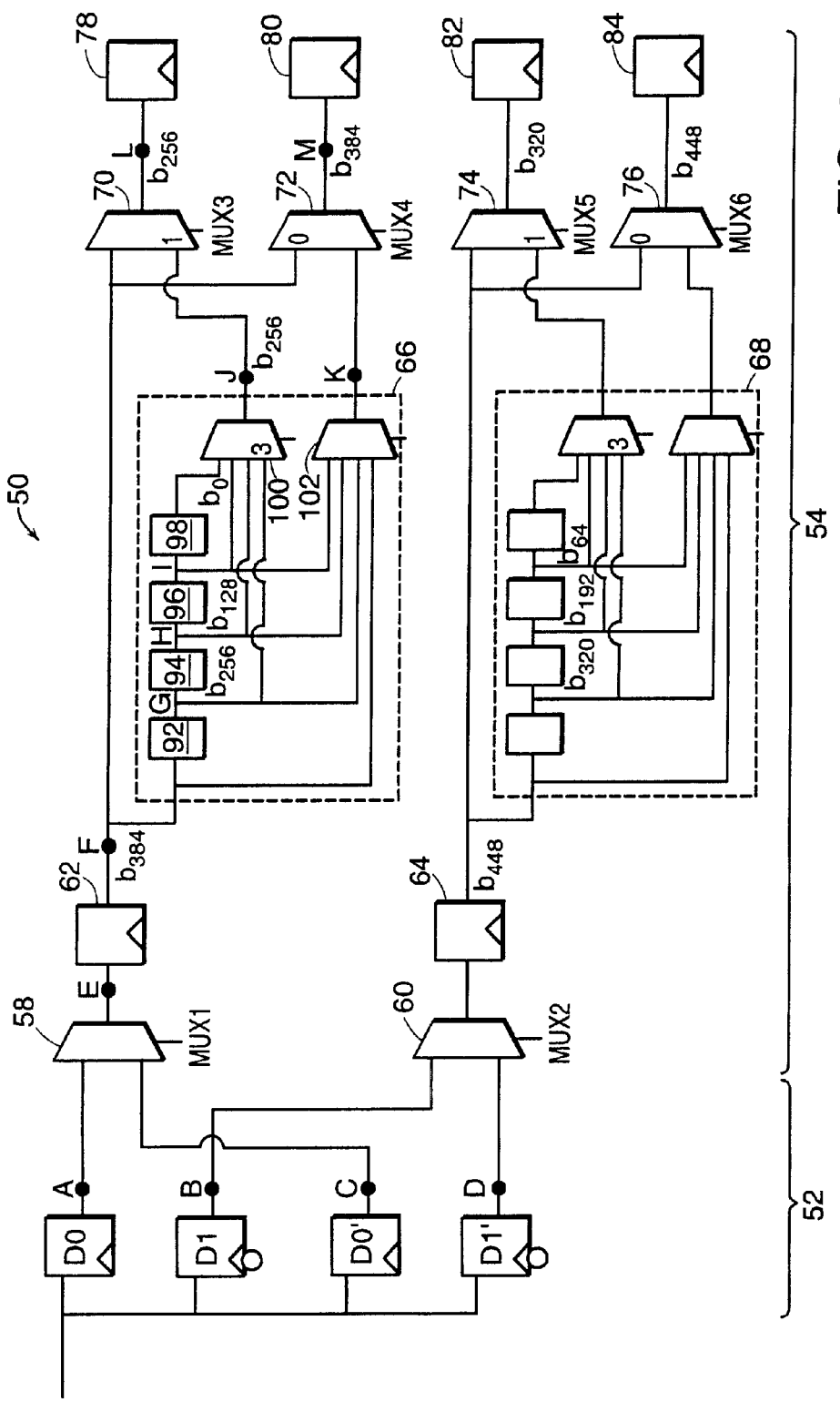
FIG. 8 is a circuit diagram of the forwarded clock receive circuit of FIG. 5 with the signals of FIG. 6 at the particular points during a next clock cycle.

FIGS. 7 and 8 show different states of the standard receiver 50 when recovering bits of the information signal with minimal time latency. In particular, when bit $b_0$ has reached Point H and bit $b_{128}$ has reached Point G (see FIG. 7), the FIFO multiplexers 100,102 of the FIFO circuit 66 (Points J and K) and the output multiplexers 70,72 (Points L and M) channel these bits to the flip-flops 78,80 for outputting. Similarly, when bit $b_{64}$ and bit $b_{192}$ have reached similar points in the FIFO circuit 68, the FIFO multiplexers 100,102 of the FIFO circuit 68 and the output multiplexers 74,76 provide the bits to the flip-flops 82,84 for outputting.

During the next cycle of the recovery clock signal (see FIG. 8), bits $b_{256}$, $b_{320}$, $b_{384}$ and $b_{448}$ are channeled from points within the standard receiver 50 to the flip-flops 78,80,82,84 for outputting. In particular, bit $b_{256}$ is channeled from the flip-flop 92 within the FIFO circuit 66 (Point G) to the output of the multiplexer 70 (Point L), and bit $b_{320}$ is channeled from a-similar location in FIFO circuit 68 to the output of the multiplexer 74. Additionally, bit $b_{384}$ is channeled directly from the recovery flip-flop 62 (Point F) to the output of the multiplexer 72 (Point M), and bit $b_{448}$ is channeled directly from the recovery flip-flop 64 to the output of the multiplexer 76. Accordingly, bits $b_{384}$ and $b_{448}$ circumvent the FIFO circuits 66,68.

It should be understood that the output flip-flops 78,80, 82,84 capture data bits exclusively from other components within the recovery stage 54. Accordingly, this capture operation remains completely within the realm of the recovery clock domain.

As shown in FIG. 6, there is a difference of three clock cycles between the time that bit $b_0$ becomes initially available at a flip-flop output of the receive stage 52 (flip-flop D0) and the time that bit $b_0$ becomes available at the input of flip-flops 78,80,82,84 of the recovery stage 54. That is, three clock cycles of the recovery clock signal elapse as bit $b_0$ travels from Point A to Point L. If each clock cycle is iOns in length, the three cycles of latency are 30ns in length. As will later be evident, measuring the latency in clock cycles or time using this procedure provides a good measure of the amount of time necessary to recover the data. The data recovery latency can be measured between other points as well, but the points used above are convenient and will suffice for explanatory purposes.

It should be understood that the cycle latency of the standard receiver 50 remains the same regardless of the ate of the recovery clock signal (provided that the limitations of the receiver are not exceeded). In particular, under normal operation at either the optimal rate or sub-optimal rate for the recovery clock signal, the standard receiver 50 will always provide the three cycle difference shown in FIG. 6.

Since the cycle latency of the standard receiver 50 remains fixed (e.g., at three cycles), it should also be understood that the time latency may change as the rate of the recovery clock signal changes. In particular, the time latency for recovering data from the information signal increases as the cycle length of the recovery clock signal increases. For example, if the optimal rate of the recovery clock signal is such that the cycle length of the recovery clock signal is 10 ns, the time latency for recovering the data is 30 ns, as explained earlier. When the recovery clock signal has a sub-optimal rate such that the cycle length of the recovery clock signal is 11 ns, the time latency for recovering the data increases to 33 ns. Accordingly, the standard receiver 50 provides longer time latency when the recovery clock signal has a sub-optimal rate. Although the increase in time latency improves the settling time allowance, the time latency is longer than is necessary.

The technique for providing data from an information signal, with the data being recovered with variable latencies depending on a rate of the recovery clock signal used when recovering the data, will now be discussed.

Variable Latency Receiver

Figure 9:
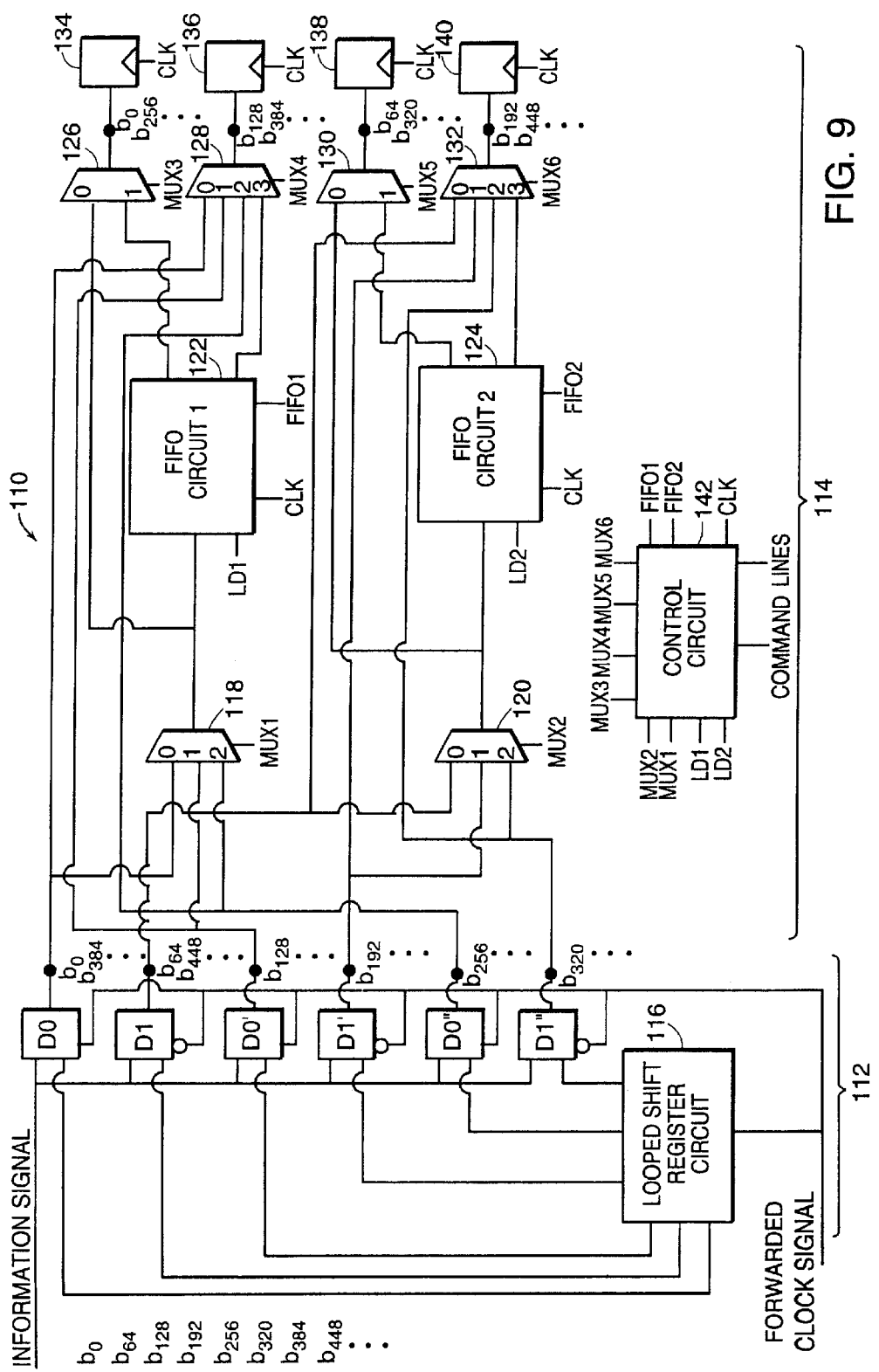
FIG. 9 is a circuit diagram of another forwarded clock receive circuit.

FIG. 9 shows a variable latency receiver 110 that recovers data with different cycle latencies when operating at different recovery clock signal speeds. In particular, he variable latency receiver 110 provides a shorter cycle latency when operating at a sub-optimal recovery clock signal rate. The variable latency receiver 110 may be disposed with other variable latency receivers in a receiver IC to receive and recover data such as that shown in FIG. 1A.

The variable latency receiver 110 includes a receive stage 112, and a recovery stage 114. The receive stage 112 includes receive flip-flops D0, D1, D0', D1', D0' and D1", and a looped shift register circuit 116. The recovery stage 114 includes recovery multiplexers 118,120, FIFO circuits 122,124, output multiplexers 126,128,130,132, output flip-flops 134,136,138,140, and a control circuit 142.

The receive stage 112 receives an information signal and a forwarded clock signal such as that shown in FIG. 3. The forwarded clock signal drives the looped shift register circuit 116 and the receive flip-flops D0, D1, D0', D1', D0" and D1" such that the receive stage 112 operates in the forwarded clock domain. In particular, the flip-flops D0, D0' and D0" latch in bits of the information signal on rising clock edges, and the flip-flops D1, D1' and D1" latch in bits of the information signal on falling clock edges. The looped shift register circuit 116 activates the receive flip-flops D0, D1, D0', D1', D0" and D1" such that the flip-flops latch in data contained within the information signal synchronously with phases of the forwarded clock signal. In particular, the receive flip-flops D0, D1, D0', D1, D0" and D1" synchronously latch in the bits of the information signal one at a time.

For the information signal 40 including bits $b_0$, $b_{64}$, $b_{128}$, $b_{192}$, $b_{256}$, $b_{320}$, $b_{384}$ and $b_{448}$, the flip-flop D0 latches in bit $b_0$ during a rising edge of a first cycle of the forwarded clock signal. Then, flip-flop D1 latches in bit $b_{64}$ during a falling edge of the first cycle of the forwarded clock signal, and so on. Accordingly, the receive flip-flops D0, D1, D0', D1', D0" and D1" operate as a receive buffer to temporarily store the bits of the information signal.

It should be understood that the receive stage 112 includes two flip-flops more than the receive stage 52 of the standard receiver 50 of FIG. 3. As a result, the windows of recovery are larger for the flip-flops of the receive stage 112 of the variable latency receiver 110. The larger windows of recovery pay for the cost of additional connections between logic cells and additional cell (gate) delays in the path (i.e., anything between the receive flip-flops and the flip-flops 134,136,138,140).

It may be possible to receive the data bits using less than six receive flip-flops if the physical devices that implement the transmit and receive logic are tight in tolerance. For example, the receive stage could use four flip-flops (D0, D1, D0' and D1') rather than six. In such a situation, some of the receive flip-flops (e.g., D0" and D1") would be unnecessary, and the multiplexers 128 and 132 would directly connect with the remaining receive flip-flops. However, decreasing the number of receive flip-flops in the receive stage 112 increases the tolerance requirements of the physical devices. On the other hand, as stated above in connection with the standard receive stage 50, increasing the number of receive flip-flops increases the settling time allowance. Increasing the number of receive flip-flops also increases the amount of timing variation of the circuitry. A suitable balance is reached with six flip-flops. Accordingly, the variable latency receiver 110 preferably includes the six receive flip-flops D0, D1, D0', D1', D0" and D1".

A recovery clock signal CLK (e.g., an internal clock signal of the receive IC) drives the recovery stage 114 such that the recovery stage 114 operates in the recovery clock domain. The recovery stage 114 recovers data contained within the information signal from the forwarded clock domain of the receive stage 112. In particular, the control circuit 142, which is controlled through command lines, operates the recovery multiplexers 118,120 such that they select the outputs of the receive flip-flops D0, D1, D0', D1', D0" and D1" and channel their contents to the FIFO circuits 122,124. As a result, the FIFO circuits 122,124 effectively recover the bits of data from the receive stage 52, and temporarily store them. The control circuit 142 operates the output multiplexers 126,128,130,132 such that the data is provided to the output flip-flops 134,136,138,140 in two consecutive cycles of the recovery clock signal. When each variable latency receiver 110 of a receive IC operates simultaneously, the data of FIG. 1A is provided in the arrangement shown in FIG. 1B.

Figure 10:
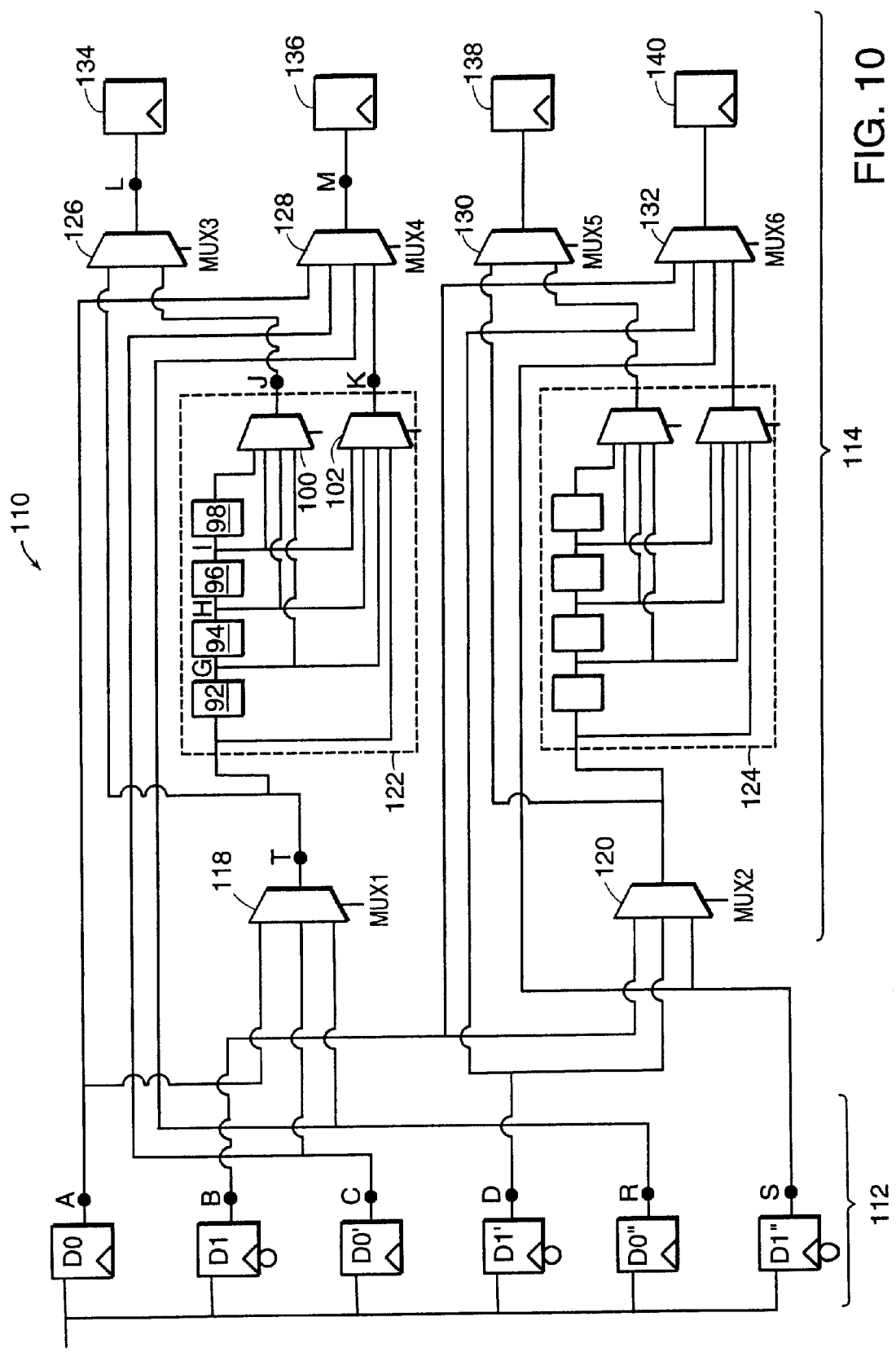
FIG. 10 is a circuit diagram of the forwarded clock receive circuit of FIG. 9 including the delay buffer circuit of FIG. 4.

FIG. 10 shows the variable latency receiver 110 of FIG. 9, with a delay buffer 90 in place of each FIFO circuit 122,124. Certain components such as the looped shift register 116 and the control circuit 142 are omitted from FIG. 10 to simplify the figure.

The operation of the variable latency receiver 110, when the recovery clock signal has the optimal rate, will now be described with reference to FIGS. 10–13. FIG. 10 is labeled at certain points in a manner similar to that of FIG. 5 for the standard receiver 50. In particular, the outputs of the receive flip-flops D0, D1, D0', D1', D0" and D1" are labeled A, B, C, D, R and S respectively. Additionally, the output of the recovery multiplexer 118 is labeled T. Furthermore, the outputs of the FIFO flip-flops 92, 94 and 96 of the FIFO circuit 122 are labeled G, H and I, respectively. Also, the outputs of the FIFO multiplexers 100 and 102 of the FIFO circuit 122 are labeled J and K, respectively. Finally, the outputs of the multiplexers 126 and 128 are labeled L and M, respectively.

Figure 11:
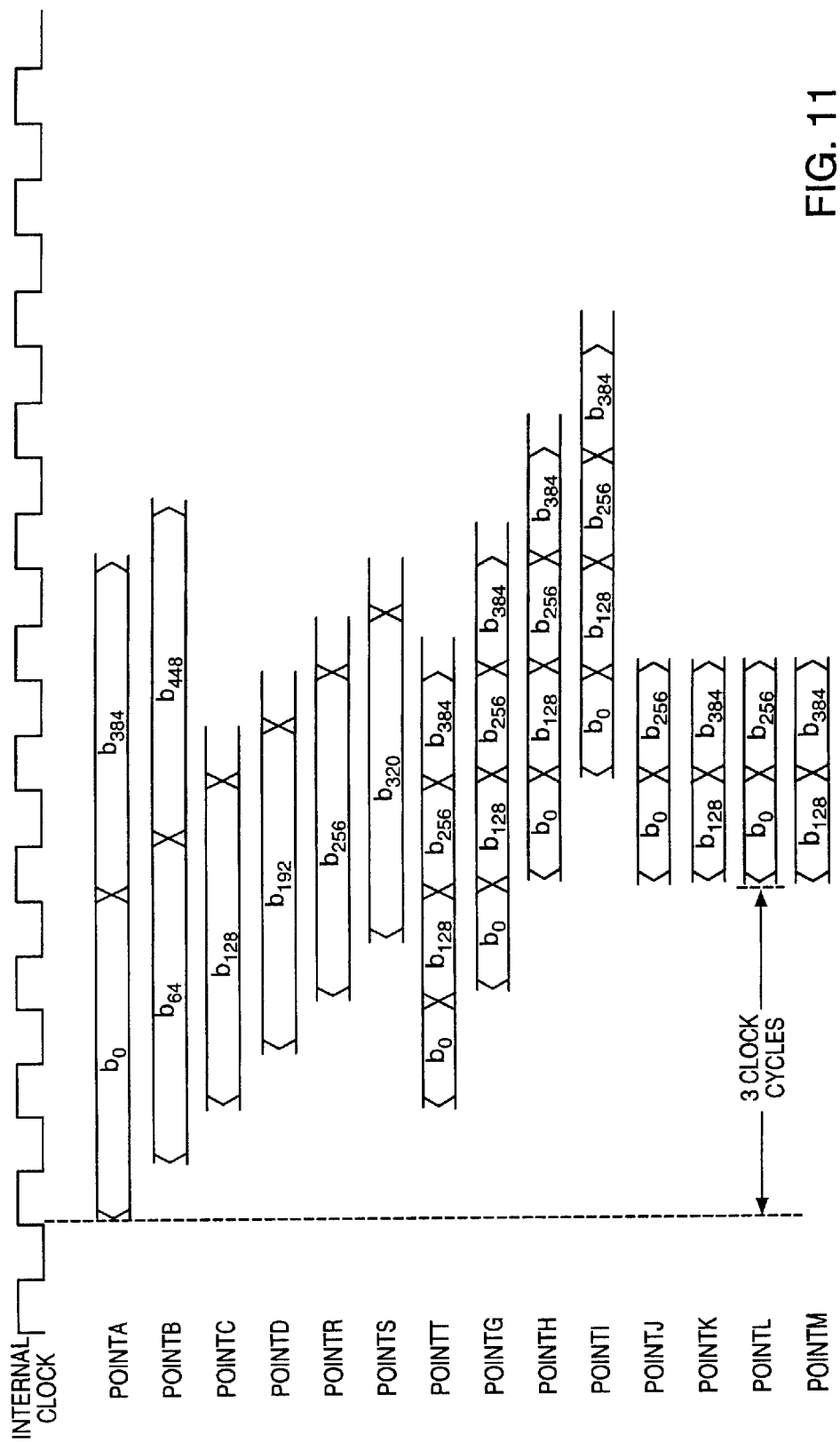
FIG. 11 is a timing diagram of signals at particular points within the forwarded clock receive circuit of FIG. 10 when the forwarded clock receive circuit operates at an sub-optimal rate.

FIG. 11 is a timing diagram showing signals at the various labeled points at different times relative to the recovery clock signal that drives the recovery stage 114 of the standard receiver 110, when the recovery clock signal has the optimal rate. Although the forwarded clock signal is not shown in FIG. 11, the forwarded clock signal has the same frequency as the recovery clock signal, and the edges of the signals closely coincide.

For the information signal 40 of FIG. 3, the variable latency receiver 110 receives bits $b_0$, $b_{64}$, $b_{128}$, $b_{192}$, $b_{256}$, $b_{320}$, $b_{384}$ and $b_{448}$ synchronously with the forwarded clock signal. In particular, the rising edge of a first cycle of the forwarded clock signal causes the flip-flop D0 to latch in bit $b_0$(Point A in FIG. 11). On the rising edge of a first clock cycle of the recovery clock signal, the recovery multiplexer 118 selects the output of the flip-flop D0 to channel its contents (bit $b_0$) to the FIFO circuit 122. The recovery multiplexer 118 is designed to provide one cycle of latency.

Similarly, the falling edge of the first cycle of the forwarded clock signal causes the flip-flop D1 to latch in bit $b_{64}$(Point B in FIG. 11). On the rising edge of a second clock cycle of the recovery clock signal, the multiplexer 120 selects the output of the flip-flop D1 and channels its contents to the FIFO circuit 124. Similar to the recovery multiplexer 118, the recovery multiplexer 120 is designed to provide one cycle of latency.

During operation, the recovery multiplexer 118 outputs a bit stream $b_0$, $b_{128}$, $b_{256}$ and $b_{384}$ (Point T), and the recovery multiplexer 120 similarly outputs a bit stream $b_{64}$, $b_{192}$, $b_{320}$ and $b_{448}$. The bit stream $b_0$, $b_{128}$ $b_{256}$ and $b_{384}$ propagates through the FIFO circuit 122 on successive clock cycles (Points G, H and I), and the bit stream $b_{64}$, $b_{192}$, $b_{320}$ and $b_{448}$ propagates through the FIFO circuit 124. The control circuit 142 controls the propagation of the bits through the FIFO circuits using load and multiplexer signals.

The FIFO multiplexers 100,102 and the output multiplexers 126,128,130,132 select particular circuit locations to read from in order to capture the bits in proper order for further processing. When the variable latency receiver 110 operates with other similar receivers in a receiver IC, each variable latency receiver 110 preferably provides the recovered bits in two consecutive recovery clock cycles with minimal time latency such that the receiver IC outputs data in the arrangement shown in FIG. 1B.

Figure 12:
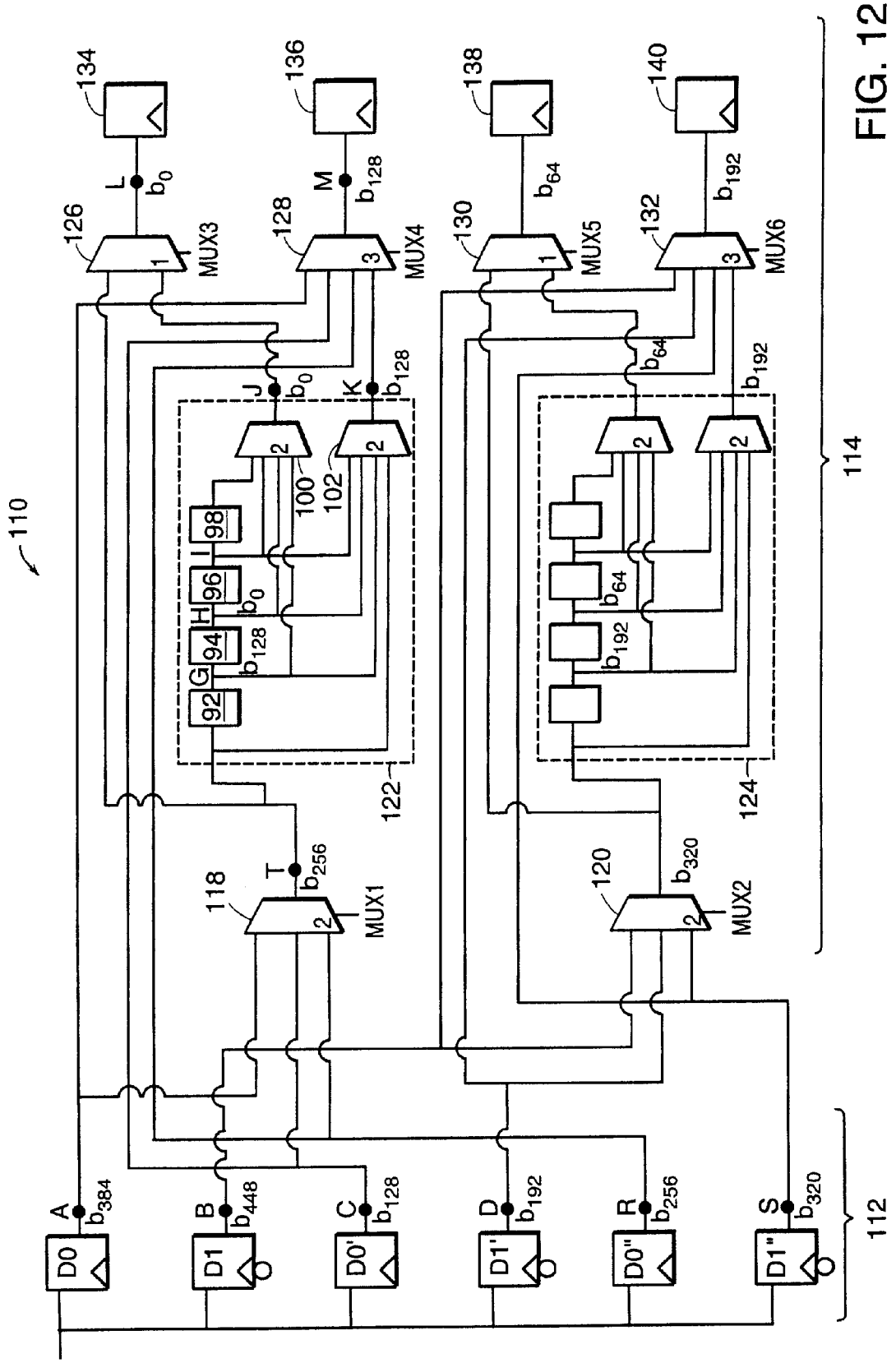
FIG. 12 is a circuit diagram of the forwarded clock receive circuit of FIG. 10 with the signals of FIG. 11 at the particular points during a particular clock cycle.
Figure 13:
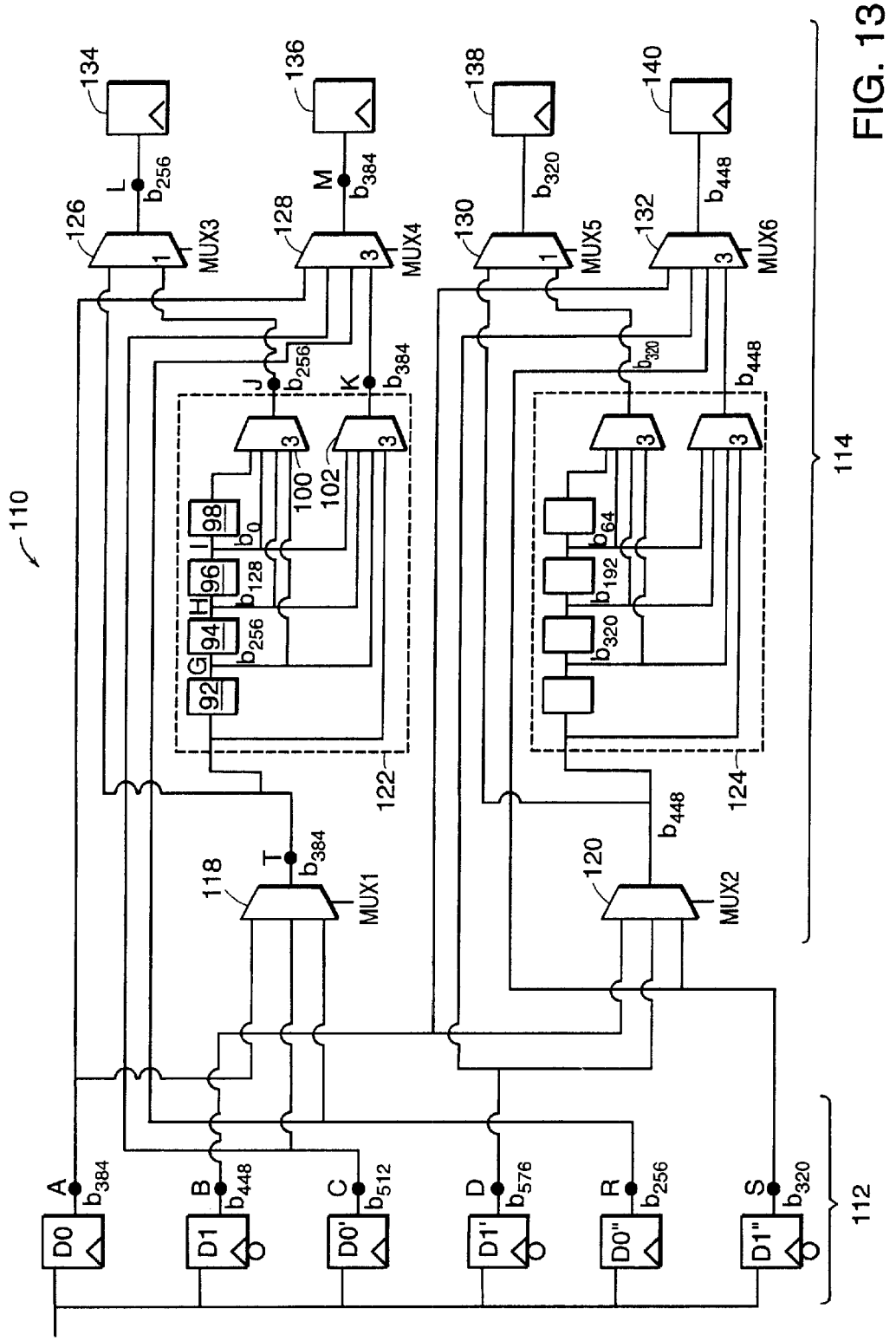
FIG. 13 is a circuit diagram of the forwarded clock receive circuit of FIG. 10 with the signals of FIG. 11 at the particular points during a next clock cycle.

FIGS. 12 and 13 show different states of the variable latency receiver 110 when recovering bits with minimal time latency when the recovery clock signal has an optimal rate.

In particular, when bit $b_0$ has reached Point H and bit $b_{128}$ has reached Point G, the FIFO multiplexers 100,102 of the FIFO circuit 122 (Points J and K) and the output multiplexers 126,128 (Points L and M) channel these bits to the flip-flops 126,128 for outputting. Similarly, when bit $b_{64}$ and bit $b_{192}$ have reached similar points in the FIFO circuit 124, the FIFO multiplexers 100,102 of the FIFO circuit 124 and the output multiplexers 130,132 provide the 30 bits to the flip-flops 138,140 for outputting. The flip-flops 134,136,138, 140 capture the bits, and may provide them to other circuits for further processing.

During the next cycle of the recovery clock signal, bits $b_{256}$, $b_{320}$, $b_{384}$ and $b_{448}$ are channeled from points within the variable latency receiver 110 to the flip-flops 134,136, 138,140 for outputting. In particular, as shown in FIG. 13, bit $b_{256}$ is channeled from the FIFO flip-flop 92 of the FIFO circuit 122 (Point G), through the FIFO multiplexer 100 of the FIFO circuit 122, to the output of the multiplexer 126 (Point L). Bit $b_{320}$ is channeled from a similar location in the FIFO circuit 124, through the FIFO multiplexer 102 of the FIFO circuit 124, to the output of the multiplexer 130. Additionally, bit $b_{384}$ is channeled directly from the recovery flip-flop 118 (Point T) to the output of the multiplexer 128 (Point M), and bit $b_{448}$ is channeled directly from the recovery flip-flop 120 to the output of the multiplexer 132. Accordingly, bits $b_{384}$ and $b_{448}$ circumvent the FIFO circuits 122,124.

As shown in FIG. 11, there is a difference of three clock cycles between the time that bit $b_0$ becomes initially available at a flip-flop output of the receive stage 112 (flip-flop D0) and the time that bit $b_0$ becomes available at the input of flip-flops 134,136,138,140 of the recovery stage 114. That is, three clock cycles of the recovery clock signal elapse as bit $b_0$ travels from Point A to Point L. If each clock cycle is 10 ns in length, the three cycles of latency are 30 ns in length. A comparison of timing diagrams for the variable latency receiver 110 (FIG. 11) and that of the standard receiver 50 (FIG. 6) indicates that the variable latency receiver 110 provides the same cycle latency as that of the standard receiver 50 when the variable latency receiver 110 operates at the optimal rate.

However, it should be understood that the cycle latency of the variable latency receiver 110 may change when operating at a sub-optimal rate. In particular, the cycle latency of the variable latency receiver 110 may become shorter when the recovery clock signal becomes sub-optimal as will now be explained with reference to FIGS. 14–16.

Figure 14:
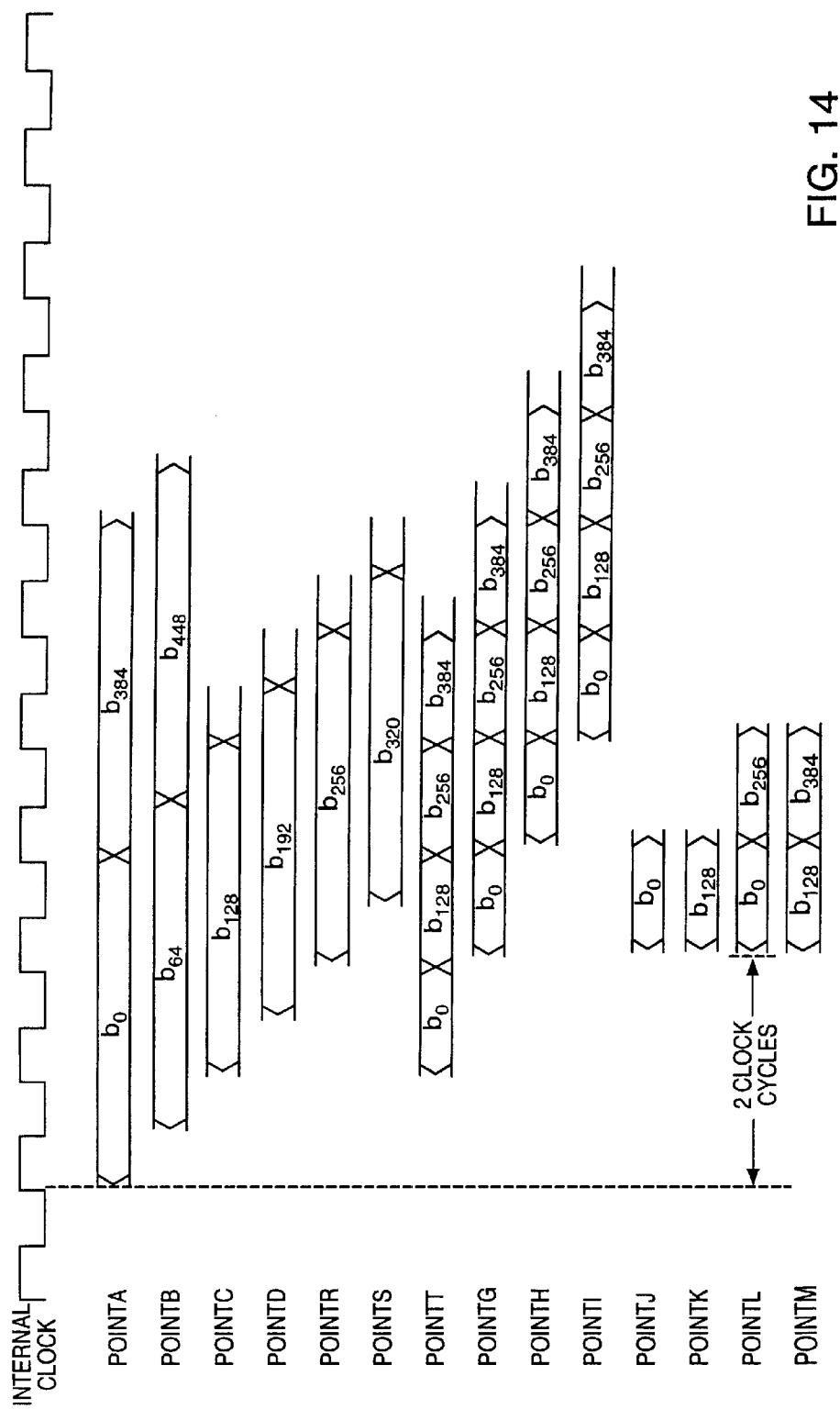
FIG. 14 is a timing diagram of signals at particular points within the forwarded clock receive circuit of FIG. 10 when the forwarded clock receive circuit operates at a sub-optimal rate.

FIG. 14 is a timing diagram showing signals at the various labeled points at different times relative to the recovery clock signal that drives the recovery stage 114 of the receiver 110 when operating at a sub-optimal frequency. Although the forwarded clock signal and the recovery clock signal are independently generated, preferably they have the same frequency and their edges closely coincide.

The operation of the receive stage 112 is the same regardless of whether the recovery clock signal has the optimal rate or the sub-optimal rate. That is, the receive stage 112 operates as a receive buffer that receives the information signal synchronously with a forwarded clock signal. In particular, the flip-flops D0, D1, D0', D1', D0" and D1" latch in bits (e.g., bits $b_0$, $b_{64}$, $b_{128}$, $b_{192}$, $b_{256}$, $b_{320}$, $b_{384}$ and $b_{448}$) synchronously with edges of the forwarded clock signal.

However, the recovery stage 114 operates differently when the recovery clock signal operates at the sub-optimal rate. In particular, the recovery stage 114 transfers contents of the flip-flops D0, D1, D0', D1, D0" and D1" (a receive buffer) to the FIFO circuits 122,124 (a delay buffer) synchronously with the recovery clock signal. Then the recovery stage 114 selectively reads from the receive flip-flops and the FIFO circuits 122,124 to form the data bit groups 24 and ECC bit groups 26 (a recovered signal) synchronously with the recovery clock signal. The recovered signal has the data contained within the information signal (see FIG. 1B).

When the output flip-flops 134,136,138,140 capture data bits directly from the receive flip-flops of the receive stage 112, the output flip-flops 134,136,138,140 effectively reach back into the forwarded clock domain to obtain the data. In this situation, the output flip-flops perform the function of recovering data from the forwarded clock domain.

Figure 15:
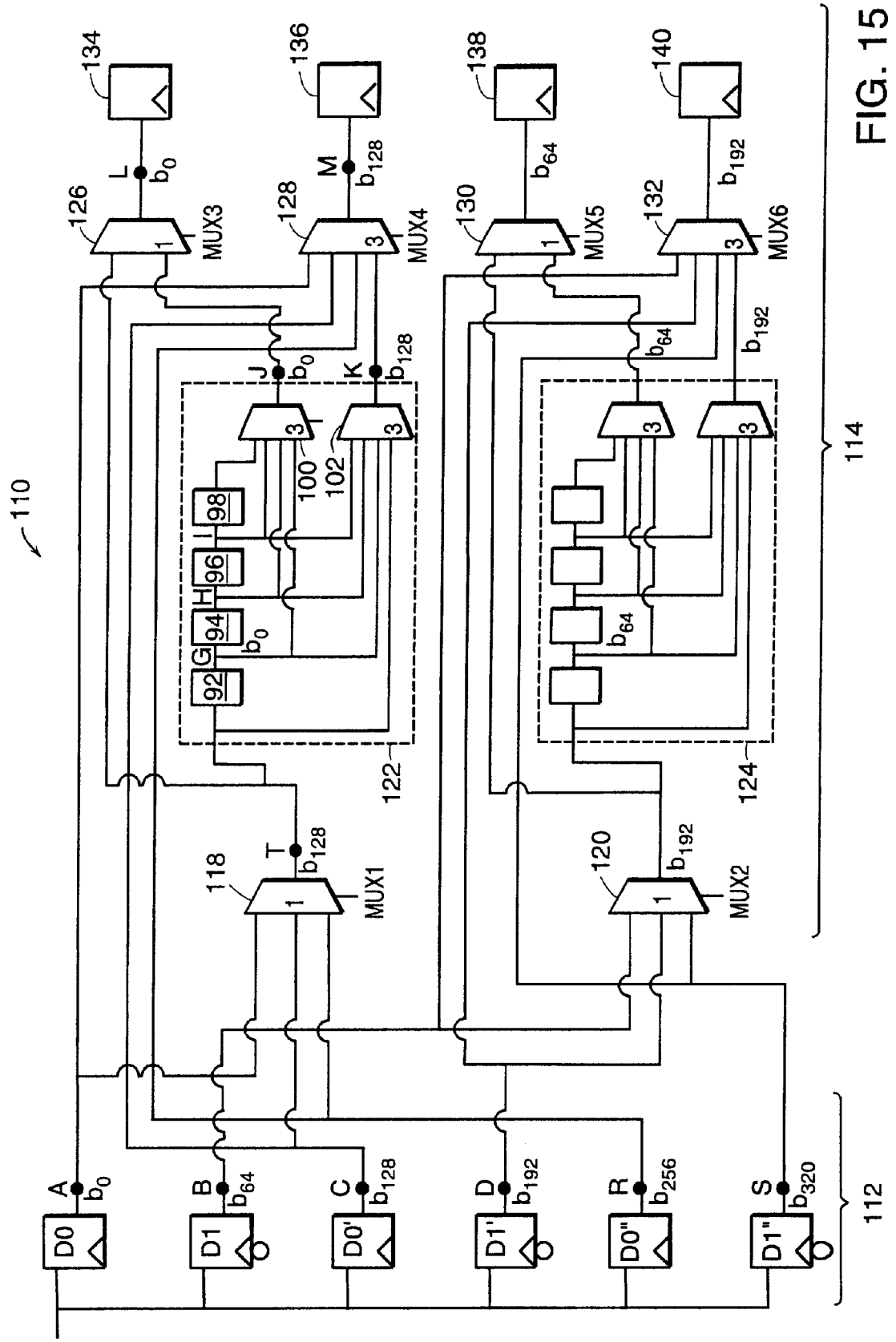
FIG. 15 is a circuit diagram of the forwarded clock receive circuit of FIG. 10 with the signals of FIG. 14 at the particular points during a particular clock cycle.

FIG. 15 shows, at a particular point in time, the locations of the bits within the variable latency receiver 110 when the recovery clock signal has a sub-optimal rate. In particular, bit $b_0$ is channeled from the output of the delay buffer flip-flop 92 (Point G) of the FIFO circuit 122 through the delay buffer multiplexer 100 (Point J) of the FIFO circuit 122, through the multiplexer 126 (Point L).

Similarly, bit $b_{64}$ is channeled from the output of the delay buffer flip-flop 92 of the FIFO circuit 124, through the delay buffer multiplexer 100 of the FIFO circuit 124, through the multiplexer 130.

Additionally, bit $b_{128}$ is channeled from the output of the multiplexer 118 (Point T), through the delay buffer multiplexer 102 of the FIFO circuit 122 (Point K), through the multiplexer 128 (Point M). Similarly, bit $b_{192}$ is channeled from the output of the multiplexer 120, through the delay buffer multiplexer 102 of the FIFO circuit 124, through the multiplexer 132.

Figure 16:
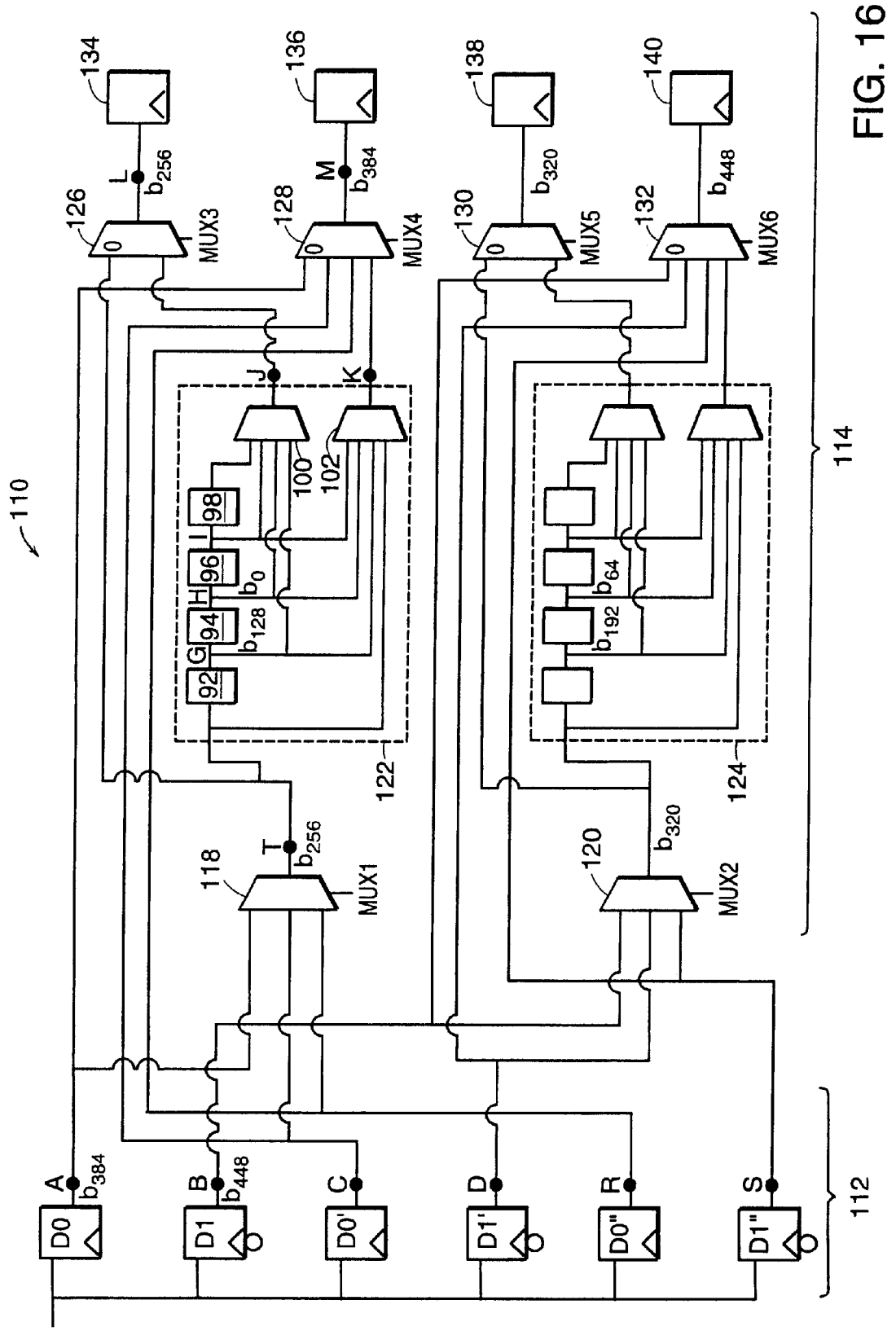
FIG. 16 is a circuit diagram of the forwarded clock receive circuit of FIG. 10 with the signals of FIG. 14 at the particular points during a next clock cycle.

In the next cycle of the recovery clock signal, the recovery stage 114 circumvents the FIFO circuits 122,124 completely, as shown in FIG. 16. In particular, bit $b_{256}$ (Point T) is channeled from the output of the multiplexer 118 directly to the multiplexer 126 (Point L). Similarly, bit $b_{320}$ is channeled from the output of the multiplexer 120 directly to the multiplexer 130. Furthermore, bit $b_{384}$ is channeled from the output of the flip-flop D0 (Point A) directly to the multiplexer 128 (Point M), and bit $b_{448}$ is channeled from the output of the flip-flop D1 (Point B) directly to the multiplexer 132.

When the output flip-flops reach back to recover data from the receive stage 112 directly, the flip-flops retrieve the data at the earliest time the data becomes available. Accordingly, the time latency for recovering the data is minimized.

As shown in FIG. 14, when operating at the sub-optimal frequency, there is a difference of two clock cycles between the time that bit $b_0$ becomes available at a flip-flop output of the receive stage 112 (flip-flop D0) and the time that bit $b_0$ becomes available at the input of flip-flops 134,136,138, 140 of the recovery stage 114. That is, two clock cycles of the recovery clock signal elapse as bit $b_0$ travels from Point A to Point L.

It should be clear that the data recovery latency is variable depending on the recovery clock signal rate, since there is a three cycle latency when operating at the optimal rate, and a two cycle latency when operating at the sub-optimal rate. That is, the cycle latency may differ as the recovery clock signal rate changes.

It is possible that the recovery clock cycle length is 10 ns for the optimal rate, and 11 ns for the sub-optimal rate. In such a situation, the time latency for recovering data at the optimal rate is 30 ns, and the time latency for recovering data at the sub-optimal rate is 22 ns. Accordingly, the time latency at the sub-optimal rate is shorter by 8 ns.

As explained above, the variable latency receiver 110 provides different cycle latencies depending on the rate of the recovery clock signal. In particular, the cycle latency may be shorter when the rate of the recovery clock signal is sub-optimal. Furthermore, the time latency may be shorter when the rate of the recovery clock signal is sub-optimal.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, the addition of the two receive flip-flops D0" and D1" expands the windows of recovery of the receive flip-flops from two cycles to three cycles. More pairs of receive flip-flops can be added to accommodate larger timing variations. On the other hand, these extra receive flip-flops may be unnecessary if the tolerances of the circuit are such that the recovery of data into the other flip-flops (e.g., flip-flops 62,64 in FIG. 3) has sufficient extra margin for a target operating frequency. As such the output multiplexers (e.g., multiplexers 70,72,74,76) can be made larger to select data from the receive buffer or the delay buffer.

What is claimed is:

1. In a forwarded clock device, a method for providing data from an information signal, comprising the steps of:
   receiving the information signal in the forwarded clock device synchronously with a forwarded clock signal; and
   recovering data contained within the information signal synchronously with a recovery clock signal such that the data is recovered with (i) a particular cycle latency when the recovery clock signal has an optimal rate for the forwarded clock device, and (ii) a different cycle latency when the recovery clock signal has a sub-optimal rate.

2. The method of claim 1, wherein the forwarded clock device includes a receive buffer that receives the information signal synchronously with the forwarded clock signal, and a delay buffer; and wherein the step of recovering includes the steps of:
   transferring contents of the receive buffer to the delay buffer synchronously with the recovery clock signal; and
   reading exclusively from the delay buffer to capture the data contained within the information signal when the recovery clock signal has the optimal rate, and selectively reading from the delay buffer and the receive buffer to capture the data contained within the information signal when the recovery clock signal has the sub-optimal rate.

3. The method of claim 1, wherein the particular cycle latency includes more cycles than the different cycle latency.

4. The method of claim 3, wherein the particular cycle latency is one cycle longer than the different cycle latency.

5. A forwarded clock device for providing data from an information signal, comprising:
   a receive stage that receives the information signal synchronously with a forwarded clock signal; and
   a recovery stage, coupled to the receive stage, that recovers data contained within the information signal synchronously with a recovery clock signal such that the data is recovered with (i) a particular cycle latency when the recovery clock signal has an optimal rate for the forwarded clock device, and (ii) a different cycle latency when the recovery clock signal has a sub-optimal rate.

6. The forwarded clock device of claim 5, wherein the receive stage includes a receive buffer that receives the information signal synchronously with the forwarded clock signal, and wherein the recovery stage includes:
   a delay buffer; and
   a control circuit, coupled to the delay buffer, that:
   transfers contents of the receive buffer to the delay buffer synchronously with the recovery clock signal, and
   reads exclusively from the delay buffer to capture the data contained within the information signal when the recovery clock signal has the optimal rate, and selectively reads from the delay buffer and the receive buffer to capture the data contained within the information signal when the recovery clock signal has the sub-optimal rate.

7. The forwarded clock device of claim 5, wherein the particular cycle latency includes more cycles than the different cycle latency.

8. The forwarded clock device of claim 7, wherein the particular cycle latency is one cycle longer than the different cycle latency.

9. In a forwarded clock device, a method for providing data from an information signal, comprising the steps of:
   receiving the information signal in the forwarded clock device synchronously with a forwarded clock signal; and
   recovering data contained within the information signal synchronously with a recovery clock signal such that the data is recovered with (i) a particular time latency when the recovery clock signal has an optimal rate for the forwarded clock device, and (ii) a shorter time latency when the recovery clock signal has a sub-optimal rate.

10. The method of claim 9, wherein the forwarded clock device includes a receive buffer that receives the information signal synchronously with the forwarded clock signal, and a delay buffer; and wherein the step of recovering includes the steps of:
   transferring contents of the receive buffer to the delay buffer synchronously with the recovery clock signal; and
   reading exclusively from the delay buffer to capture the data contained within the information signal when the recovery clock signal has the optimal rate, and selectively reading from the delay buffer and the receive buffer to capture the data contained within the information signal when the recovery clock signal has the sub-optimal rate.

11. A forwarded clock device for providing data from an information signal, comprising:

a receive stage that receives the information signal synchronously with a forwarded clock signal; and a recovery stage, coupled to the receive stage, that recovers data contained within the information signal synchronously with a recovery clock signal such that the data is recovered with (i) a particular time latency when the recovery clock signal has an optimal rate for the forwarded clock device, and (ii) a shorter time latency when the recovery clock signal has a sub-optimal rate.

12. The forwarded clock device of claim 11, wherein the receive stage includes a receive buffer that receives the information signal synchronously with the forwarded clock signal, and wherein the recovery stage includes:

a delay buffer; and a control circuit, coupled to the delay buffer, that:

transfers contents of the receive buffer to the delay buffer synchronously with the recovery clock signal, and reads exclusively from the delay buffer to capture the data contained within the information signal when the recovery clock signal has the optimal rate, and selectively reads from the delay buffer and the receive buffer to capture the data contained within the information signal when the recovery clock signal has the sub-optimal rate.

13. A method for providing data from an information signal, comprising the steps of:

receiving the information signal in a receive buffer synchronously with a forwarded clock signal;

within a recovery clock cycle, transferring contents of the receive buffer to a delay buffer synchronously with a recovery clock signal; and within the recovery clock cycle, selectively reading directly from the receive buffer and the delay buffer to form a recovered signal that is synchronous with the recovery clock signal, the recovered signal having the data contained within the information signal.

14. The method of claim 13, wherein the receive buffer includes multiple storage elements, and wherein the step of selectively reading includes:

selecting and reading from an element of the receive buffer such that the data is recovered with minimal latency.

15. The method of claim 14, wherein a multiplexer is interconnected between an output of the receive buffer and an input of the delay buffer, and wherein the step of selecting and reading includes the step of:

sampling at the output of the receive buffer to circumvent the multiplexer.

16. The method of claim 14, wherein a multiplexer is interconnected between an output of the receive buffer and an input of the delay buffer, and wherein the step of selecting and reading includes the step of:

sampling at the input of the delay buffer to include a signal delay caused by the multiplexer.

17. A forwarded clock device for providing data from an information signal, comprising:

a receive stage having a receive buffer that receives the information signal synchronously with a forwarded clock signal;

a recovery stage, coupled to the receive stage, having:

a delay buffer, and a control circuit that within a recovery clock cycle, transfers contents of the receive buffer to the delay buffer synchronously with a recovery clock signal and within the recovery clock cycle, that selectively reads directly from the receive buffer and the delay buffer to form a recovered signal that is synchronous with the recovery clock signal, the recovered signal having the data contained within the information signal.

18. The forwarded clock device of claim 17, wherein the receive buffer includes multiple storage elements, and wherein the control circuit of the recovery stage includes:

a recovery multiplexer that selects and reads from a storage element of the receive buffer such that the data is recovered with minimal latency.

19. The forwarded clock device of claim 18, wherein the receive stage includes a receive multiplexer interconnected between an output of the receive buffer and an input of the delay buffer, and wherein the recovery multiplexer has an input that samples the output of the receive buffer to circumvent the receive multiplexer.

20. The forwarded clock device of claim 18, wherein the receive stage includes a receive multiplexer interconnected between an output of the receive buffer and an input of the delay buffer, and wherein the recovery multiplexer has an input that samples the input of the delay buffer to include a signal delay caused by the receive multiplexer.

* * * * *